US010976467B2

(12) United States Patent
Griffin et al.

(10) Patent No.: US 10,976,467 B2
(45) Date of Patent: Apr. 13, 2021

(54) WALK-THROUGH DETECTOR SYSTEMS AND METHODS

(71) Applicant: Fisher Research Labs, Inc., El Paso, TX (US)

(72) Inventors: John C. Griffin, Las Cruces, NM (US); William A. Rademacher, El Paso, TX (US)

(73) Assignee: FISHER RESEARCH LABS, LLC, El Paso, TX (US)

( * ) Notice: Subject to any disclaimer, the term of this patent is extended or adjusted under 35 U.S.C. 154(b) by 75 days.

(21) Appl. No.: 16/456,808

(22) Filed: Jun. 28, 2019

(65) Prior Publication Data

US 2020/0408949 A1    Dec. 31, 2020

(51) Int. Cl.
*G08B 23/00* (2006.01)
*G01V 13/00* (2006.01)
*B64F 1/36* (2017.01)
*G01V 3/10* (2006.01)

(52) U.S. Cl.
CPC ............ *G01V 13/00* (2013.01); *B64F 1/36* (2013.01); *G01V 3/10* (2013.01)

(58) Field of Classification Search
CPC ................................. G01V 13/00; B64F 1/36
See application file for complete search history.

(56) References Cited

U.S. PATENT DOCUMENTS

| | | | |
|---|---|---|---|
| 4,906,973 A * | 3/1990 | Karbowski | G01V 3/105 324/233 |
| 5,672,807 A | 9/1997 | Gonsalves | |
| 6,133,829 A | 10/2000 | Johnstone et al. | |
| 6,696,947 B1 | 2/2004 | Bybee | |
| 7,145,328 B2 * | 12/2006 | Manneschi | G01V 13/00 324/228 |
| 7,145,456 B2 * | 12/2006 | Castle | G01V 3/104 340/552 |
| 7,193,524 B2 * | 3/2007 | Castle | G01V 3/104 340/551 |

(Continued)

FOREIGN PATENT DOCUMENTS

CN        108897056 A    11/2018

OTHER PUBLICATIONS

International Search Report and Written Opinion dated Oct. 13, 2020, issued in counterpart Application No. PCT/US2020/40136. (13 pages).

*Primary Examiner* — Brian L Swenson
(74) *Attorney, Agent, or Firm* — Westerman, Hattori, Daniels & Adrian, LLP

(57) ABSTRACT

In some preferred embodiments, an inverted U-shaped detector is provided that includes a) novel and convenient support structure to support lower ends of side panels and b) novel and convenient wheel structure to install wheels to a lower end of the side panels to facilitate manipulation, assembly, portability and/or transport. In some preferred implementations, the support structure can be attached to the lower ends of the side panels, then wheels can be attached to a lower end of one of the side panels, and then the device can be tilted and rolled for portability and transport. In some preferred embodiments, the structure is configured to enable a single individual to install the support structure and the wheel structure, and also to move, relocate or transport (e.g., roll) the detector device.

27 Claims, 16 Drawing Sheets

(56) References Cited

U.S. PATENT DOCUMENTS

| | | | |
|---|---|---|---|
| 8,125,335 B2* | 2/2012 | Manneschi | G01V 3/104 |
| | | | 340/551 |
| 9,562,986 B2* | 2/2017 | Peyton | G01V 3/104 |
| 2004/0000999 A1* | 1/2004 | Turner | G01V 3/10 |
| | | | 340/572.4 |
| 2007/0030141 A1 | 2/2007 | Manneschi et al. | |
| 2008/0157986 A1 | 7/2008 | Proctor et al. | |
| 2011/0299659 A1* | 12/2011 | Gray | G01V 5/0025 |
| | | | 378/87 |
| 2012/0069964 A1 | 3/2012 | Scholling | |

* cited by examiner

FIG. 2
FIG. 3
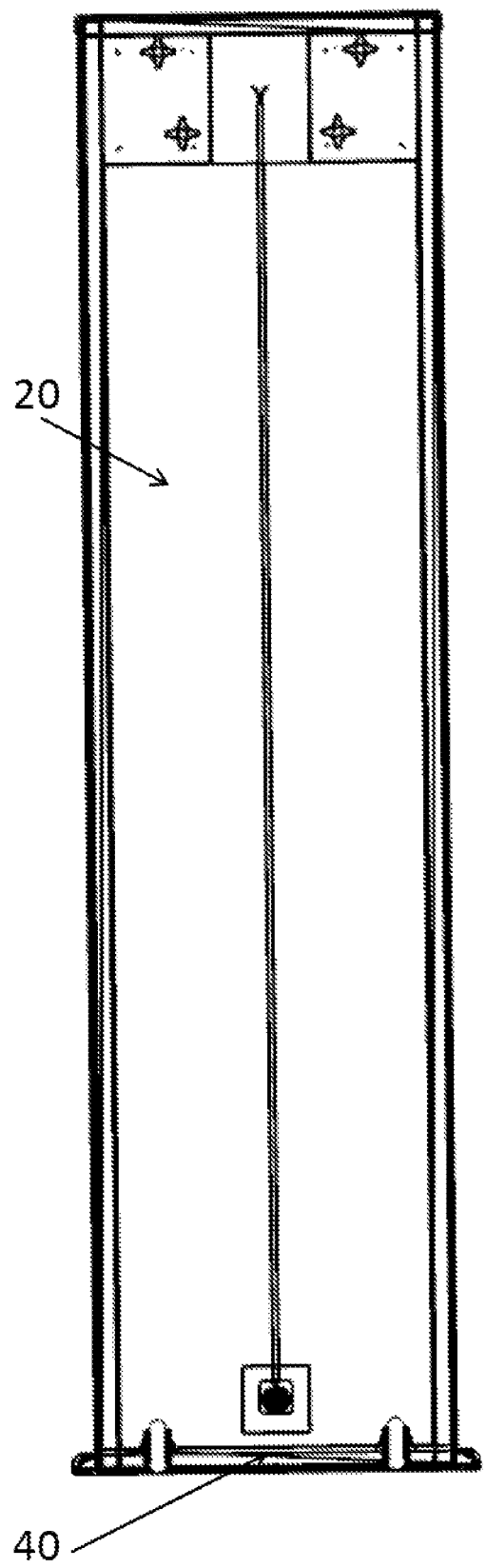
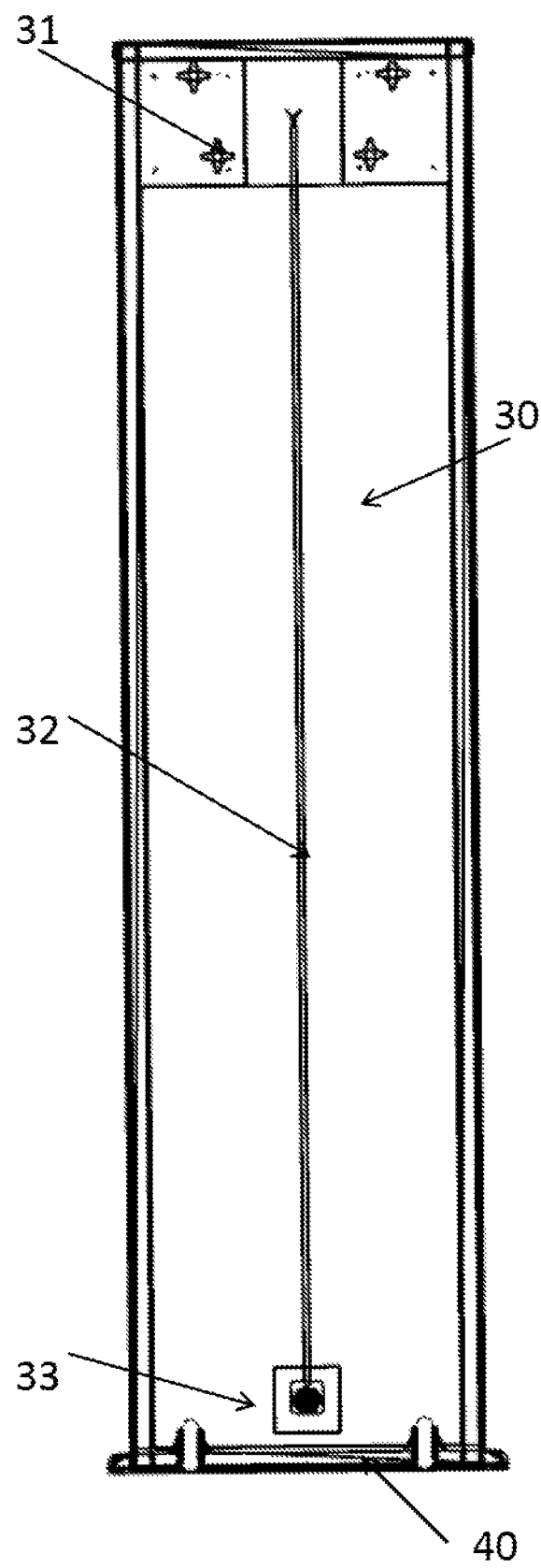

WALK-THROUGH DETECTOR SYSTEMS AND METHODS

BACKGROUND

Field of the Invention

The present application relates generally to walk-through detectors and preferred embodiments provide improved walk-through metal detector systems and methods having improved manipulation, assembly, portability and/or transport.

General Background Discussion

Walk-through detectors are used in a variety of circumstances to help identify individuals having certain materials or the like. Walk-through metal detectors are configured to create a walk-through path and to perform detection of individuals traversing the path. Walk-through detectors are commonly used in, e.g., airports, office buildings, court houses, schools, athletic stadiums, and a variety of other facilities within which detection of items or objects is desired.

Typically, such detectors are employed for safety purposes, such as, for example, to help ensure that individuals do not carry dangerous items (such as, e.g., guns, knives and/or other weapons) into a particular facility. However, such detectors can be employed for a variety of purposes.

Walk-through detectors are often configured to detect metals. Some illustrative walk-through metal detectors are seen in the following U.S. and foreign patents and applications, the entire disclosures of which are all incorporated herein by reference: U.S. Pat. Nos. 8,125,335; 7,145,456; 7,145,328; 6,133,829; 4,906,973; U.S. Design Pat. No. D297,221; PCT Patent Application No. WO 2004/097456A2.

While a variety of walk-through detectors are known, existing systems have a variety of limitations in, for example, their assembly, portability and/or transport. The preferred embodiments overcome such and/or other limitations of existing walk-through metal detectors.

SUMMARY OF THE PREFERRED EMBODIMENTS

The preferred embodiments overcome the above and/or other problems in the background art.

According to some embodiments, a walk-through detector adapted for handling by one or snore user without external tools, is provided that includes:

an upwardly extending left side panel;
an upwardly extending right side panel;
a top member connecting between the left side panel and the right side panel proximate upper ends of the left side panel and the right side panel; and
detector handling structure for handling of the walk-through detector by one or more user without external tools, including:

a) at least one replaceable wheel structure configured to be removably attached to the left side panel and/or the right side panel proximate their lower ends without employing external tools while the left side panel and the right side panel are in a resting position on a ground or floor surface and without lifting the detector;
b) at least one replaceable support member configured to be removably attached to the left and right side panels proximate their lower ends by manually elongating the at least one replaceable support member such that end projections of the at least one replaceable support member are received within receiving holes proximate the lower ends of the left and right side panels:
c) at least one compartment within the top member storing at least one replaceable support member and/or at least one replaceable wheel member after installation of the walk-through detector; and/or
d) at least one compartment within a footer member attached to a bottom end of the left or right side panel, the compartment having an openable cover and having a bottom hole in a floor of the compartment for extending a ground-attaching member to a ground or floor surface and said compartment having a leveling mechanism therein for leveling of said detector on the ground or floor surface;

whereby said walk-through detector can be handled by one or more user without external tools to facilitate transport or locating of the detector by the one or more user.

According to some embodiments, the walk-through detector is a walk-through metal detector. According to some embodiments, the walk-through detector is substantially an inverted U-shape, with the left side panel and the right side panel forming legs of the U-shape and the top member forming a base of the U-shape. In some embodiments, the top member of the walk-through detector is a control housing containing control structure of the walk-through detector.

According to some embodiments, the detector further includes the at least one replaceable wheel structure and the at least one replaceable support member, and wherein the at least one compartment within the top member includes a bottom panel that pivots downwardly to expose the at least one replaceable wheel structure and the at least one replaceable support member to a user. Moreover, in some embodiments, the at least one replaceable support member and the at least one replaceable wheel member is mounted such as to move along with the bottom panel such as to be brought closer to the user upon downwardly pivoting the bottom panel.

According to some embodiments, the detector includes at least one of a) the at least one replaceable wheel structure and b) the at least one replaceable support member, and wherein the left and right side panels each include footer members having structure for replaceably attaching at least one of a) the at least one replaceable wheel structure and b) the at least one replaceable support member.

According to some embodiments, the detector includes the at least one replaceable support member, and wherein each the at least one replaceable support member includes a telescoping brace member that is configured to be replaceably extended between the first and second side panels.

According to some embodiments, the at least one replaceable wheel structure includes a metal support bracket that rotatable supports a wheel, wherein the metal support bracket is removably connectable to at least one of the first or second side panels by laterally inserting a leg portion of the metal bracket within a supporting recess in the first or second side panels while the first and second side panels are in a resting position on a floor or ground surface without lifting of the first or second side panels. According to some embodiments, the detector further includes a spring-biased locking pin that retains the leg portion within the supporting recess upon insertion of the leg portion within the supporting recess.

According to some further embodiments of the invention, a method of handling a walk-through detector without external tools by one or more user is provided that includes:

a) providing a walk-through detector including:
an upwardly extending left side panel;
an upwardly extending right side panel;
a top member connecting between the left side panel and the right side panel proximate upper ends of the left side panel and the right side panel; and
detector handling structure for handling of the walk-through detector by one or more user without external tools, including:

i) at least one replaceable wheel structure configured to be removably attached to the left side panel and/or the right side panel proximate their lower ends without employing external tools while the left side panel and the right side panel are in a resting position on a ground or floor surface and without lifting the detector;

ii) at least one replaceable support member configured to be removably attached to the left and right side panels proximate their lower ends by manually elongating the at least one replaceable support member such that end projections of the at least one replaceable support member are received within receiving holes proximate the lower ends of the left and right side panels;

iii) at least one compartment within the top member storing at least one replaceable support member and/or at least one replaceable wheel member after installation of the walk-through detector; and/or iv) at least one compartment within a footer member attached to a bottom end of the left or right side panel, the compartment having an operable cover and having a bottom hole in a floor of the compartment for extending a ground-attaching member to a ground or floor surface and the compartment having a leveling mechanism therein for leveling of the detector on the ground or floor surface; and b) manually transporting or locating the walk-through detector by one or more user without external tools to facilitate transport or locating of the detector by the one or more user.

In some embodiments, the method further includes:

having at least one user manually attach at least one replaceable wheel structure to the left side panel or the right side panel without employing external tools while the left side panel and the right side panel are in a resting position on the ground or floor surface and without lifting the detector; and having the at least one user manually incline the walk-through detector to a tilted orientation such that at least one replaceable wheel structure supports the detector upon the ground or floor surface and at least one replaceable support member supports weight of the left side panel or the right side panel fluffiest from the ground or floor surface when in the tilted orientation.

Moreover, in some embodiments, the method further includes providing the at least one compartment in the top member, wherein the at least one compartment in the top member includes a bottom panel that pivots downwardly, and having the at least one user pivot the bottom panel such as to present at least one replaceable support member or at least one replaceable wheel structure contained within the at least one compartment.

Moreover, in some preferred embodiments, the method is implemented by a single user, whereby a single user can readily handle the detector device, such as, e.g., for transport or locating of the detector device, and, especially, in preferred embodiments, without additional external tools being required.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 2 is a left side, view of the walk-through detector shown in FIG. 1;

FIG. 3 is a right side view of the walk-through detector shown in FIG. 1;

FIGS. 14B and 14C are schematic diagrams illustrating how the wheel structure is connected to and/or removed from the footer according to some illustrative embodiments, Wherein FIG. 14B shows the wheel structure connected to the footer and FIG. 14C shows the wheel structure removed from the footer;

Figure 1:
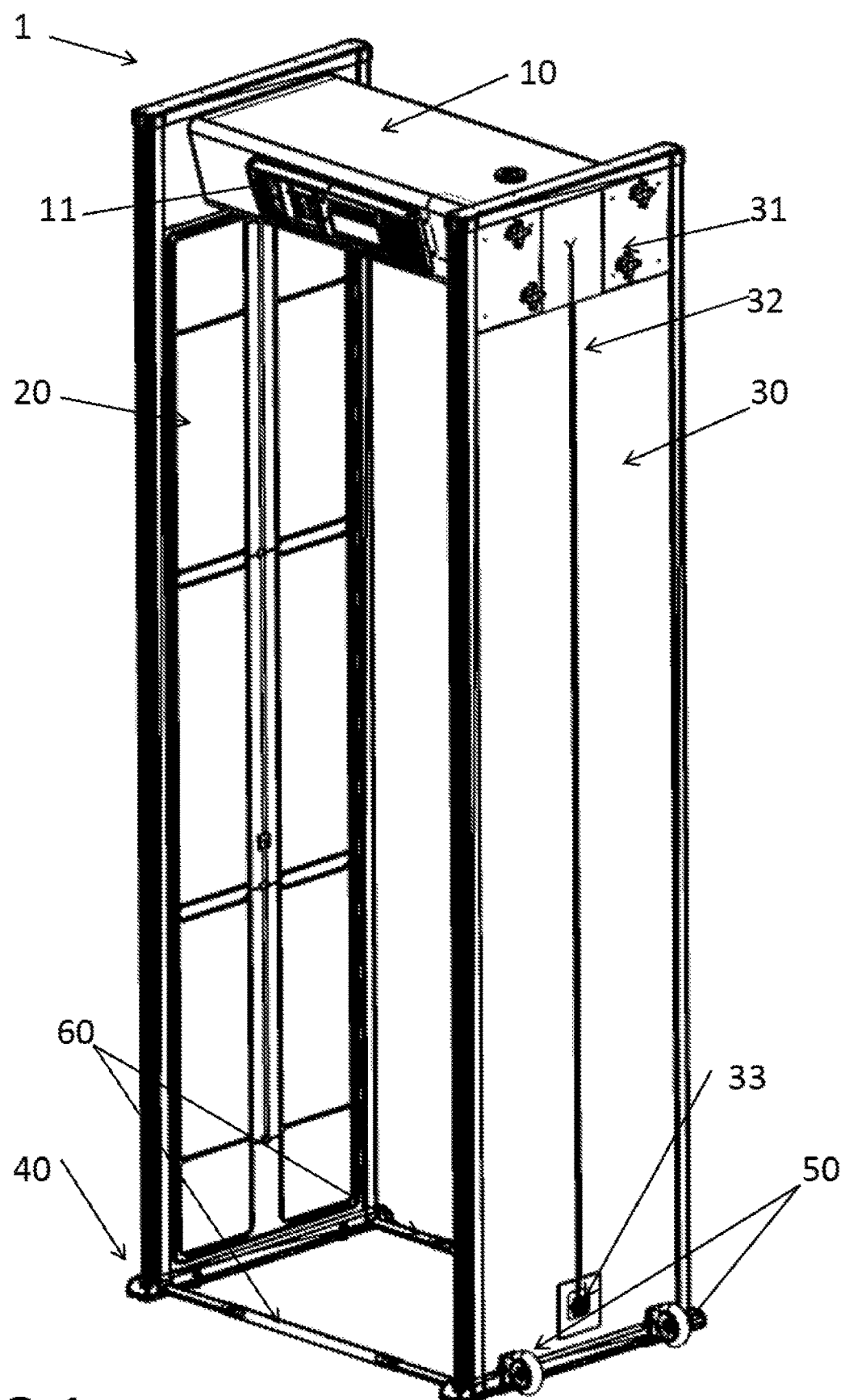
FIG. 1 is a top front perspective view of an inverted U-shaped walk-through detector according to some embodiments of the invention.
Figure 4:
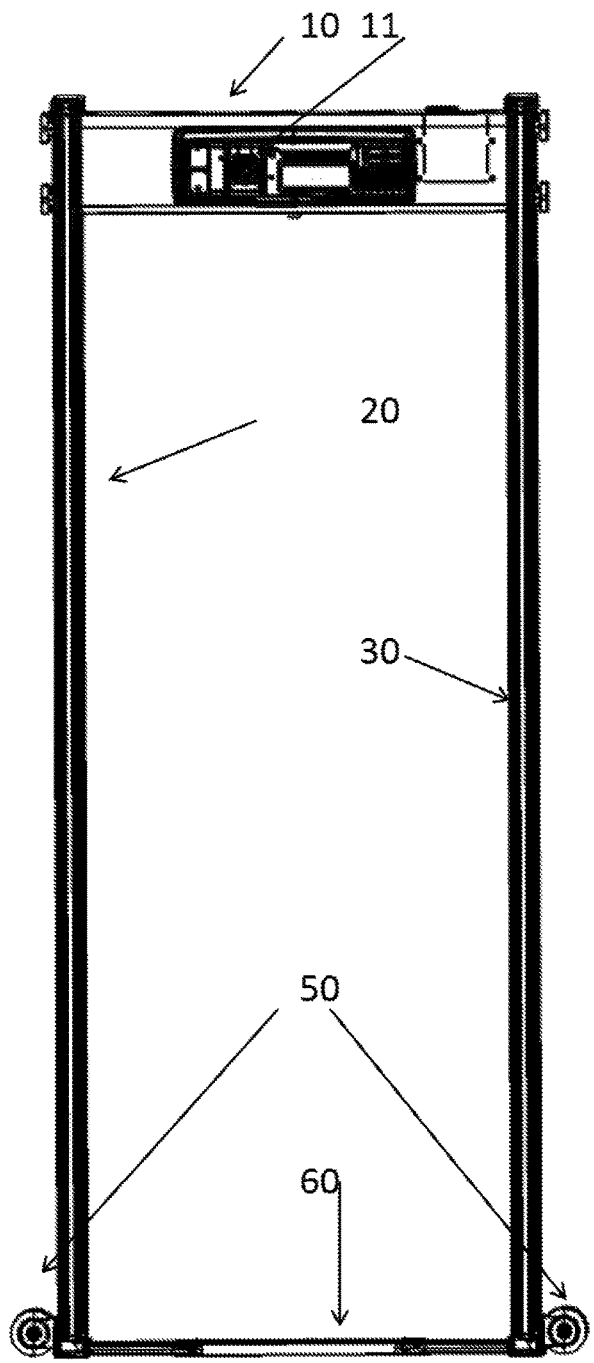
FIG. 4 is a front view of the walk-through detector shown in FIG. 1.
Figure 5:
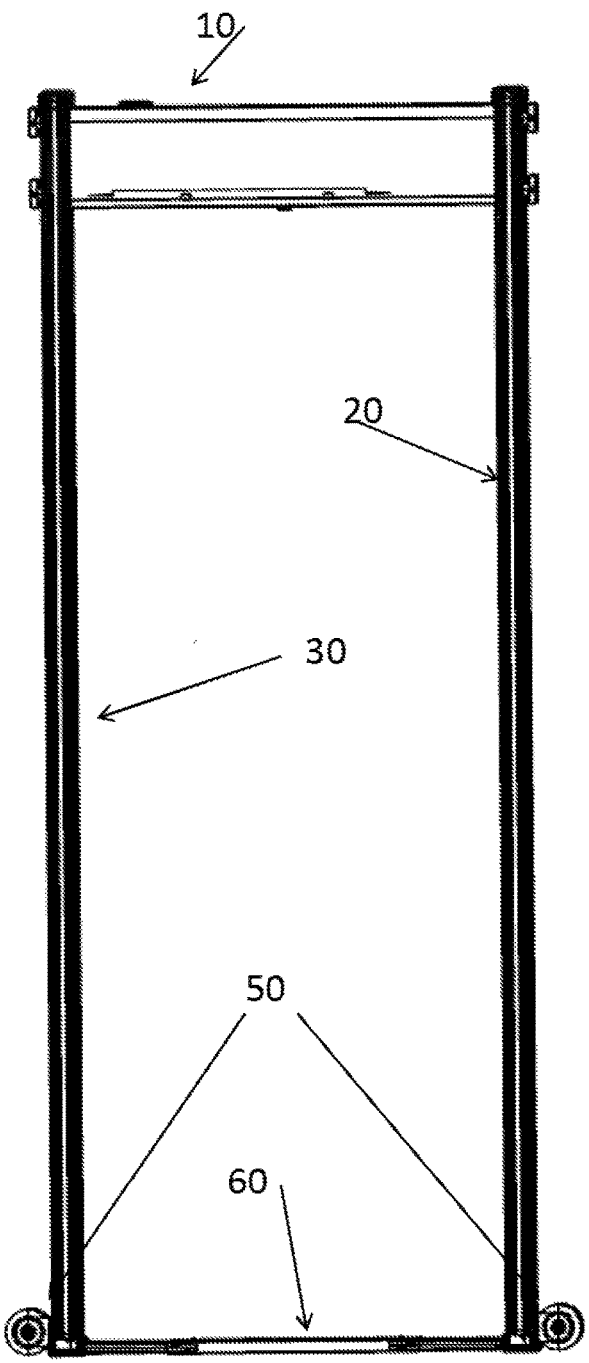
FIG. 5 is a rear view of the walk-through detector shown in FIG. 1.

The embodiments shown in FIGS. 1-20 show components of illustrative embodiments proportionally to scale in individual figures. In some preferred embodiments, components would be proportionally sized and shaped as shown in one or more, or all, of FIGS. 1-20. In some illustrative and non-limiting alternative embodiments, proportional sizes can be varied plus or minus 10%, or, in other embodiments, plus or minus 25%, or, in other embodiments, plus or minus 50%.

DETAILED DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Overview of Exemplary Embodiments

The present inventors have discovered that there are two primary problems in existing walk-through metal detectors.

Firstly, walk-through metal detectors are typically cumbersome and difficult to set up and, thus, typically require more than one individual to assembly a complete device. For example, in some existing walk-through metal detectors, one individual needs to support components, while a second individual installs and tightens fasteners to hold components of the device together.

Secondly, walk-through metal detectors have difficulty with portability and/or transport. Typically, a walk-through metal detector is configured and sized similar to a common door frame. The walk-through detector structure generally includes two upwardly extending support members or side panels and a horizontally extending top member joining the two support members, such as to form an inverted U-shape. This inverted U-shape configuration leads to complexities in manipulation and transport of the device, which can be easily damaged upon tilting and/or otherwise manipulating of the device. Notably, the connections between the support members and the top member are subject to great stress due to the weight of the support members, leading to complexities in transport.

The preferred embodiments of the present invention involve a system and method that greatly facilitates manipulation, assembly, portability and/or transport of walk-through detectors.

In some preferred embodiments, an inverted U-shaped detector is provided that includes a) novel and convenient support structure to support lower ends of side panels and b) novel and convenient wheel structure to install wheels to a lower end of the side panels to facilitate manipulation, assembly, portability and/or transport. In some preferred implementations, the support structure can be attached to the lower ends of the side panels, then wheels can be attached to a lower end of one of the side panels, and then the device can be tilted and rolled for portability and transport. In some preferred embodiments, the structure is configured to enable a single individual to install the support structure and the wheel structure, and also to move, relocate or transport (e.g., roll) the detector device. For example, in the preferred embodiments, the support structure and the wheel structure can be installed without lifting or otherwise moving the inverted U-shaped metal detector while it is in a standing operating position. In some preferred embodiments, the device includes wheel structure that enables wheels to be removable installed on the lower end of either of the side panels for flexibility in use. In the preferred embodiments, once the detector is located in a desired operating location, the wheel structure and the support structure can be removed and stored for later usage. In the preferred embodiments, the wheel structure and support structure includes components that are removed and placed within a storage compartment within the U-shaped detector. In some preferred embodiments, the storage compartment is located within the top member and is readily accessed by an individual as needed.

In some preferred embodiments, a walk-through detector includes at least some, preferably all, of the following features.

Preferred Components of Exemplary Embodiments

In some preferred embodiments, the device includes mobility structure for enhanced mobility, portability and/or transport of the device.

a. Removable

In some preferred embodiments, the mobility structure can be added and/or removed for easy installment and/or removal by a user.

b. Leveling Feet

In some preferred embodiments, the mobility structure includes leveling feet that can be added and/or removed for easy installment and/or removal by a user. The leveling feet can be stored in a convenient storage compartment and added during installation to facilitate manipulation of the device so as to enhance stability on non-level ground surfaces, thus facilitating mobility and manipulation by enabling the device to be readily located on a wider range of surfaces (i.e., with less user manipulation or positioning adjustment of the device). Among other things, the removable and storable leveling feet provides greater flexibility and facilitates mobility and manipulation of the device.

Notably, the leveling feet structure is also preferably configured to enable replacement or removal of the leveling feet without lifting or manipulation of the detector device, whereby the leveling feet can be readily installed, removed, manipulated and/or used by a single user.

c. Removable Lock Down Bolts

In some preferred embodiments, the device accommodates removable lock-down bolts that facilitate fixing of the detector device at an installation position or location, whether temporarily or permanently. In preferred embodiments, the lock-down bolts can be stored located within a covered compartment during use, whereby the lock-down bolts can be covered by caps to hide the attachment to the flooring for aesthetics and concealment. Removal of these caps, enables simple removal and/or installation of bolts for ease of installation and removal. As indicated above, in some preferred implementations, the device is not sold to an end user or customer along with a locking bolt, but rather, the end user of the device can install desired locking bolts (or other appropriate ground or floor attaching item (e.g., screws, pins, etc.)) within the respective compartments of the footer portions for attachment to the ground or floor as desired.

d. Removable Wheels

In some preferred embodiments, the device includes removable (e.g., replaceable) Wheels that can be readily installed and/or removed to facilitate flexibility in moving, transport, portability and/or manipulation of the position of the detector device. In preferred embodiments, the removable wheels can be installed and/or removed simply (e.g., by a single individual) without otherwise moving the position or orientation of the detector device (e.g., without needing to lift a side or portion of the detector device), whereby such wheels can readily be removed or installed even by a single user.

In some preferred embodiments, the removable wheels are readily connected to the side panels employing an easily attached wheel-mounting bracket that is readily attached (e.g., sliding attached) to lower ends of the side panels. In some embodiments, a novel L-shaped bracket is employed. In some preferred embodiments, the wheel-mounting brackets are readily maintained in a usage position upon mounting via a push-button latch feature, that quickly and easily latches the bracket in a usage position upon installation, and that can readily be disengaged manually by a user for simple removal of the wheels as desired. In the preferred implementations, the removable wheels can be readily installed and/or removed by a user manually, without the need for separate tools, such as, e.g., by simple manually pressing the push-buttons to release the wheels when desired.

e. Removable Support Braces

In some preferred embodiments, the detector device includes removable and replaceable support structure including removable and replaceable support braces that can be attached to lower portions of side panels to facilitate manipulation, transport and portability of a U-shaped detector structure. In some preferred embodiments, the replaceable support braces are telescoping braces that can be readily compacted to a shorted length for easy storage within a compartment within the detector device and readily extended to a lengthened length for mounting in a support position attached to lower ends of the side panels. In some embodiments, the support braces are mountable within receiving recesses within feet portions attached at the lower ends of the side panels. In the preferred embodiments, the telescoping braces can be manually extended and/or contracted (i.e., shortened) by a user without tools to facilitate manual operation and use without requiring additional tools or the like.

f. Support Footer

In some preferred embodiments, the device includes novel support footers (support feet) that are mounted to lower ends of the side panels of the device. In the preferred embodiments, these novel support feet include novel features enabling implementation of one or more, preferably all, of the above-described novel a) removable lock-down bolts, b) removable wheels, and/or c) removable support brackets. Towards that end, the support feet preferably includes novel attachment structure for removable and replaceable attachment of one or more, preferably all, of the above-described novel a) removable lock-down bolts, b) removable wheels, and/or c) removable support brackets. Notably, the novel support feet are preferably configured to enable a single user to readily remove and/or attach such components without lifting or otherwise moving or manipulating the detector device to facilitate manipulation, portability, transport and management of the detector device.

g. Storage Compartment Caddy

In the preferred embodiments, the detector device includes a novel storage compartment caddy to facilitate easy management and storage of manually managed components of one or more, preferably all, of the above a) removable lock-down bolts, b) removable wheels, and/or c) removable support brackets. In some preferred embodiments, the novel storage compartment caddy is located within a top support member of a U-shape walk-through detector. In some preferred embodiments, the storage compartment includes a movable support member that lowers downward to present components of one or more of the a) removable lock-down bolts, b) removable wheels, and/or c) removable support brackets at a lower position to facilitate access and handling of the components by a user.

In some preferred embodiments, the storage compartment is a common storage compartment that contains electronics and control features of the detector device. Towards that end, access to the electronics and control features of the device and also to the components for one or more of the a) removable lock-down bolts, b) removable wheels, and/or c) removable support brackets can be readily accessed via the same compartment. In some embodiments, the compartment can include a cover plate or door that is mounted to a lower portion of a top support member that also functions as a control box or housing that houses the above-noted components. In some preferred embodiments, the cover plate or door is pivotally attached to a lower side of the control box or housing. In some preferred embodiments, the cover plate or door includes a lock to enable access only by a user of the device. In some embodiments, the lock can be opened via a key, whereby, in some embodiments, the only external object required for management or manipulation of the detector device required for a user is such a key, which can access both the internal control and electronics of the device as well as the above noted components of the a) removable lock-down bolts, b) removable wheels, and/or c) removable support brackets. In some embodiments, the lock can be an electronic lock that is opened by inputting of a code, such that a key may not be required or such that the device can be alternately opened by either a key or by entry of a code.

h. Detector Control Features

In some preferred embodiments, the detector has a U-shaped structure with a top support member that functions as a control box or housing containing control features and electronics of the device. In some preferred embodiments, the control box or housing includes internal control components and a display that is located at a lateral side of the control box or housing, which provides a visual display during use. In some preferred embodiments, the display is angled downward slightly such as to facilitate observation to a user's line of sight during use (e.g., when entering or walking through the walk-through detector).

In some preferred embodiments, the display includes an opaque membrane glass or plastic display surface) that does not show display elements until lit up or turned on. In some embodiments, the display can include a bezel structure or other method for mounting of a display surface. In some embodiments, such an opaque or otherwise obscured display helps to keep components free from access or attention of individuals entering the walk-through detector, such as, e.g., during normal use of the device.

In illustrative embodiments, the detector can include features, including electronics and hardware for detecting of metals or the like. In some embodiments, the detector can include components as set forth in any of the above-noted U.S. and foreign patents and applications, the entire contents of which are incorporated herein by reference as though recited herein in full: U.S. Pat. Nos. 8,125,335; 7,145,456; 7,145,328; 6,133,829: 4,906,973; U.S. Design Pat. No. D297,221; PCT Patent Application No. WO 2004/097456A2.

In some illustrative embodiments, a detector can include transmitter coils, receiver coils and an electronic processing circuit configured to detect signal variations received on the receiver coils, relative to a reference value. In some embodiments, the receiver coils can, e.g., detect the presence of metals influencing the magnetic and/or electrical field.

In some embodiments, a detector can include components for detecting of elements emitting radiation, such as, e.g., radioactive radiation. In some embodiments, a radiation detector can include, e.g.,. a Geiger sensor or a gamma detector or the like.

Discussion of Illustrative Embodiments

The accompanying FIGS. 1-20 show some illustrative embodiments of the invention, which involve an inverted U-shaped detector. In some preferred embodiments, the detector is a metal detector. However, in other embodiments, any other type of detection can be implemented, such as, e.g., any other type of detection discussed herein or in any of the above-noted patents and applications incorporated into this application.

With reference to FIG. 1, this figure shows an illustrative top front perspective view of an inverted U-shaped walk-through detector 1 according to some embodiments of the invention. In the preferred embodiments, the detector is a walk-through metal detector and, thus, includes control features as discussed above. Towards that end, in some illustrative embodiments, the metal detector can include transmitter coils, receiver coils and an electronic processing circuit configured to detect signal variations received on the receiver coils, relative to a reference value. In some embodiments, the receiver coils can, e.g., detect the presence of metals influencing the magnetic and/or electrical field. As indicated above, in some embodiments, the metal detector can include components as set forth in any of the above-noted U.S. and foreign patents and applications, the entire contents of which are incorporated herein by reference as though recited herein in full: U.S. Pat. Nos. 8,125,335; 7,145,456; 7,145,328; 6,133,829; 4,906,973; U.S. Design Pat. No. D297,2211 PCT Patent Application No. WO 2004/097456A2.

With reference to FIG. 1, the walk-through metal detector 1 preferably includes a left side panel 20 and a right side panel 30 that are connected proximate their upper ends to left and right side ends of a top support member that also operates as a control box or control housing 10. In preferred embodiments, the control housing 10 is removably attached to the upper ends. of the left and right side panels 20, 30 via manually rotatable locking bolt members 31, Which include manually rotatable knobs (shown in FIG. 1) and a threaded bolt shaft that extends into respective threaded receiving holes on the lateral sides of the control box for releasable mounting thereto. In this manner, the metal detector 1 can readily be shipped or transported in a disassembled state with the side panels 20, 30 and control housing 10 separated (e.g., in some embodiments, these components 10, 20, 30 can be shipped within a common storage box aligned with an lying flat against each other to facilitate handling during shipping).

As shown in FIG. 1, the control housing preferably includes a display screen 11, Which includes both a display (such as, e.g., an LCD or LED display screen, indicator lights or indicia, and/or the like) and user input (such as, e.g., via a touch screen {which may be integrated with the display in some embodiments}, control buttons, control keys, switches and/or the like). In some illustrative embodiments, the an electrical power chord extends down at least one of, but preferably both of the side portions 20, 30 as shown in FIGS. 2 and 3 (for versatility in installation) to plug interface (s) 33 which can receive a power chord for supplying power to the electronics and control features of the metal detector (e.g., contained within the control housing 10).

In some preferred embodiments, a power chord can be stored within a compartment in the control housing 10 (see discussions below regarding illustrative control housing compartment structure). Then, upon locating of the walk-through detector at a desired use location, the power chord can be removed and attached to the desired plug interface 33 depending on the location of an electrical outlet in proximity to the detector 1.

In the view of the walk-through metal detector 1 shown in FIG. 1, the device is depicted with removable structure attached that is employed to facilitate manipulation, assembly, portability and/or transport. In particular, in the illustrated example, the inverted U-shaped detector 1 has a) a novel and convenient support structure 60 that includes two telescoping braces that are removably mounted to support lower ends of side panels and b) novel and convenient wheel structure 50 that is removably mounted to a lower end of at least one of the side panels to facilitate manipulation, assembly, portability and/or transport. In some preferred implementations, the removable support structure can be attached to the lower ends of the side panels, and then the device can be tilted and rolled for portability and transport, with the wheel structure 50 enabling rolls of the device while the support structure 60 enabling tilting of the device while maintaining rigidity structural soundness of the device 1 during portability and/or transport. Here, portability of the detector enabled by this removable structure encompasses, e.g., a) manual handling of the device, such as, e.g., by tilting and rolling the device by one or more individuals and b) carrying of the device in a substantially horizontal state (e.g., with the side panels 20, 30 extending substantially horizontally) by, e.g., a plurality of individuals manually holding the device 1 at upper and lower ends. Although. FIGS. 2-8, for example, show wheel structure attached to footers 40 of both side panels 20, 30, it should be appreciated that in the preferred embodiments, wheel structure can be attached to only one of the footers of the side panels 20 or 30 as desired. That is, the footers 40 of both side panels 20, 30 preferably include features to enable removable mounting of such wheel structure 50 as needed, whereby a user can readily attach such wheel structure to a desired side depending on circumstances, or can even switch placement of wheel structure as desired during use. Of course, if desired, in some embodiments, wheel structure 50 can be attached to both sides 20, 30 as shown. Although two wheels 50W are employed on a single side as needed in the most preferred embodiments, in other embodiments additional wheels could be attached in a similar manner. Similarly, while a single wheel 50W may be less desirable and more difficult for manipulation or transport, in some embodiments a single wheel 50W could be mounted to facilitate manipulation or transport in similar manner.

Figure 10:
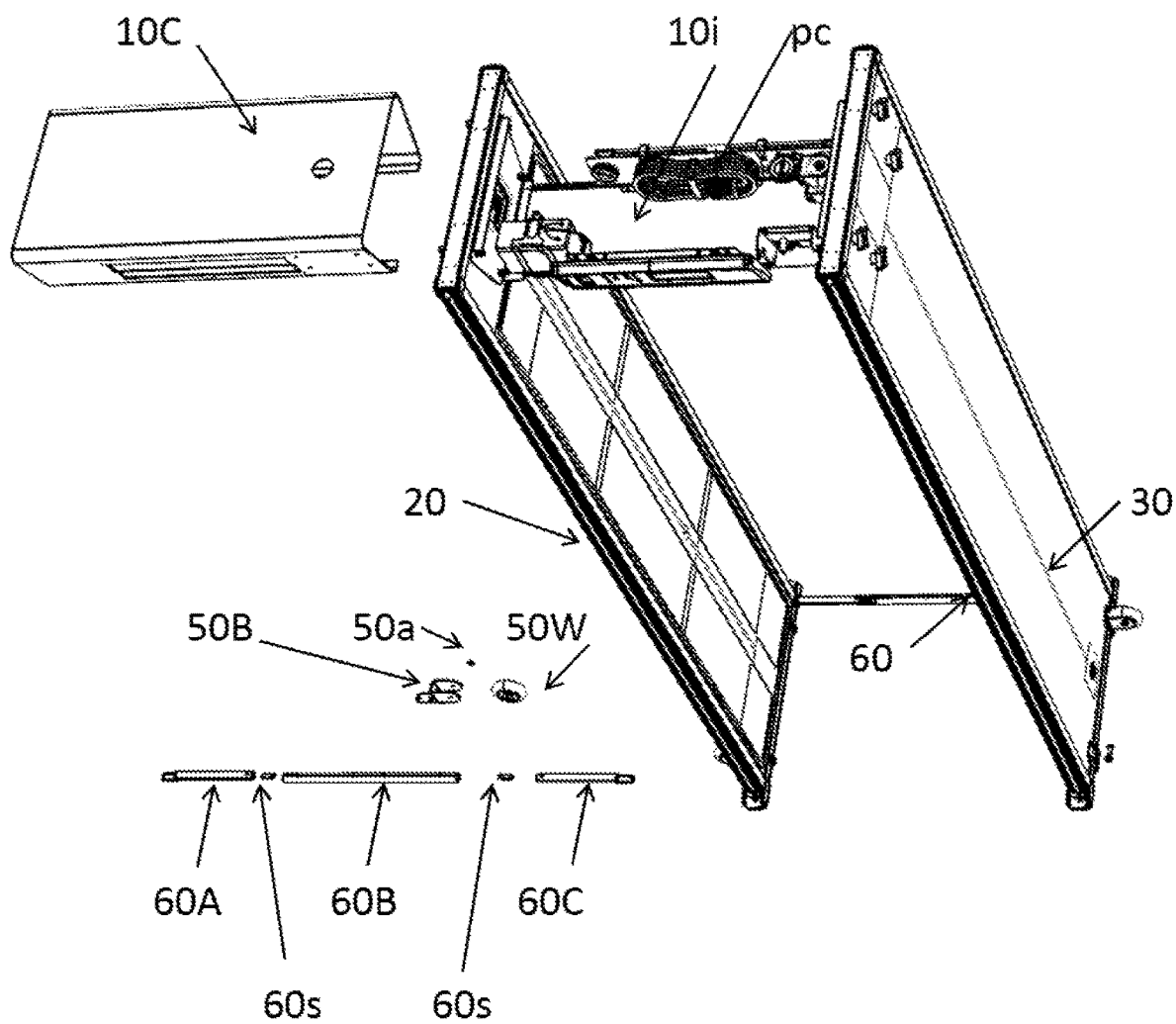
FIG. 10 is a top front perspective view of the walk-through detector shown in FIG. 1 with components separated to facilitate reference.
Figure 11:
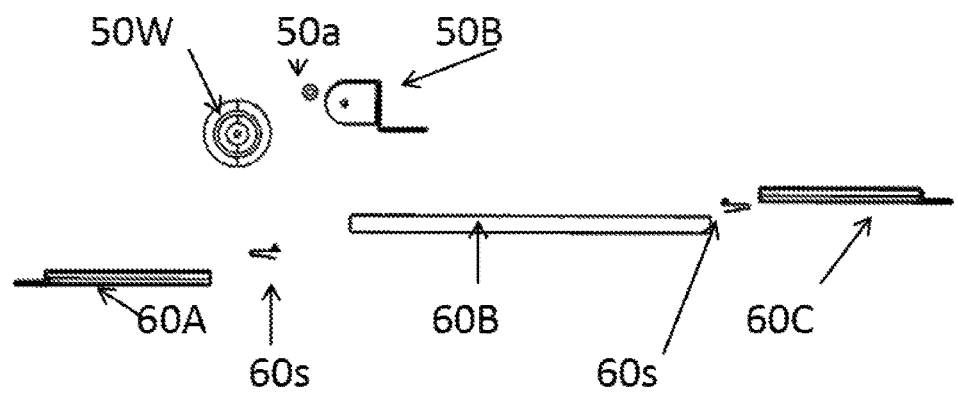
FIG. 11 is a side view of wheel structure and brace structure components of the walk-through detector shown in FIG. 1.
Figure 12:
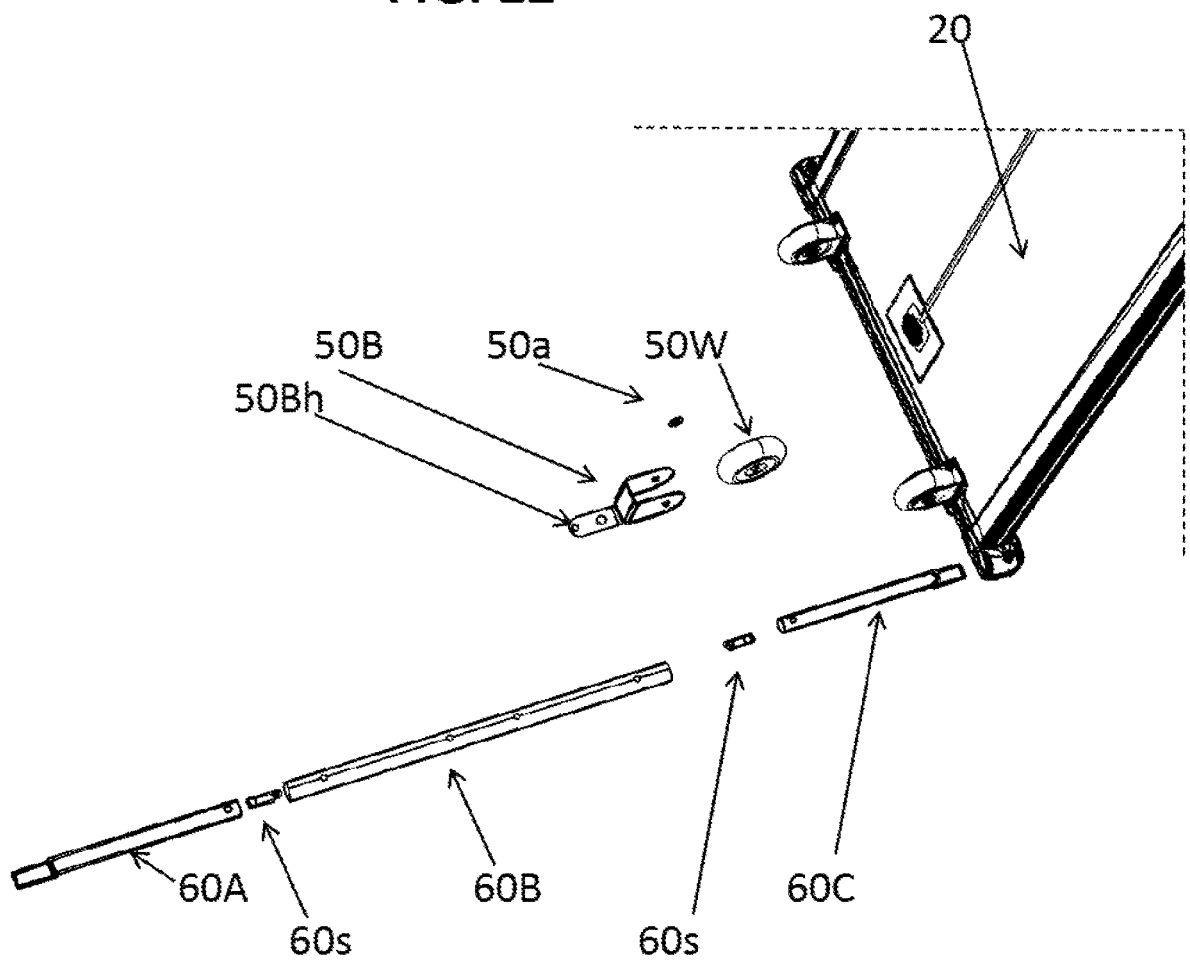
FIG. 12 is a top left perspective view of the walk-through detector with components separated as in FIG. 10.

Referring now to FIGS. 10-12, in some preferred embodiments, the support structure 60 includes two telescoping brace members that comprise a plurality of tubes 60A, 60B, and 60C that are telescopically connected together. For example, in some embodiments the tubes 60A and 60C can have a smaller diameter than the central rube 60B and slidably move therein. In some embodiments, the plurality of tubes can be locked into place employing a fixing element 60s, such as, e.g., a spring-biased pin that attaches to the respective tubes 60A and 60C and that is configured to be biased outwardly into receiving holes in the tube 60B to retain the support structure at a set length. To adjust the length, the spring-biased pin can be manually pressed to push the pin from the hole and, thus, enable the tubes to slide relative to one another. As shown in FIG. 10, the outer ends of the tubes 60A and 60C preferably include rectangular cross-section ends that are sized and configured to be received within corresponding rectangular receiving holes 40rh1 that extend through the footers 40 of each of the side panels 20 and 30 (see, e.g., receiving hole 40rh1 shown in FIG. 13A). In use, the tubes 60A, 60B and 60C can be telescopically extended across the width of the gap between the side panels such that the rectangular ends of the tubes 60A and 60C are received within the rectangular receiving holes with a wider circular cross-section portion of the tubes 60A and 60C abutting inner sides of the footers 40. At this position, the telescoping tubes can be retained in place employing the fixing elements 60s, such as, e.g., spring-biased pins.

Figure 13A:
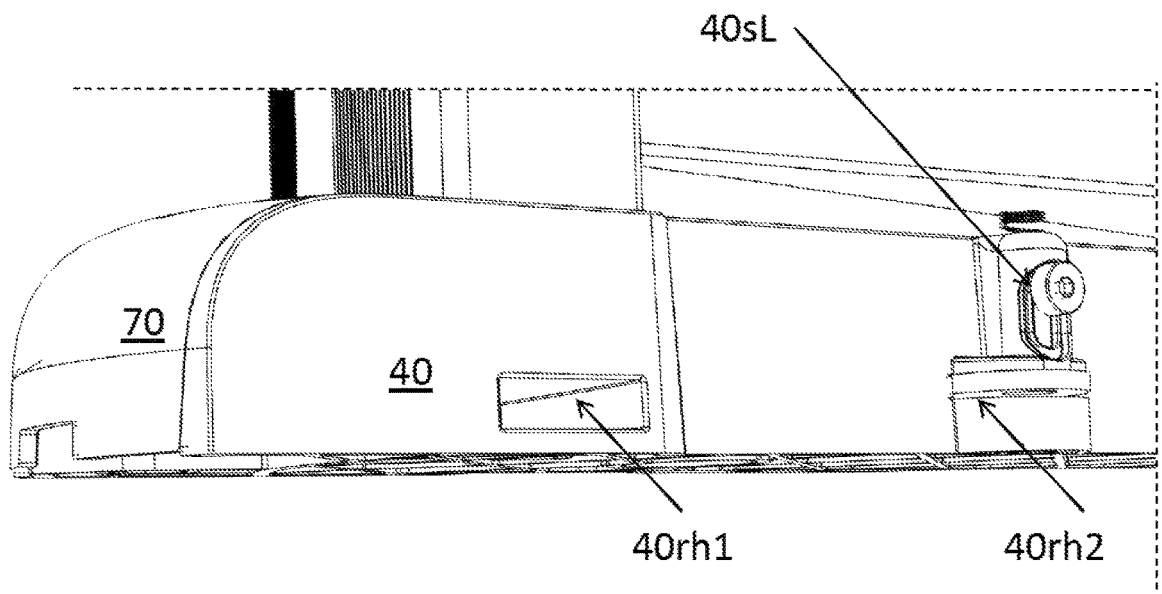
FIG. 13A is an inside perspective side view showing a portion of a footer connected to a side panel of the detector shown in FIG. 1, showing an inside view of the footer facing the walk-through passage between the side panels of the walk-through detector.
Figure 13B:
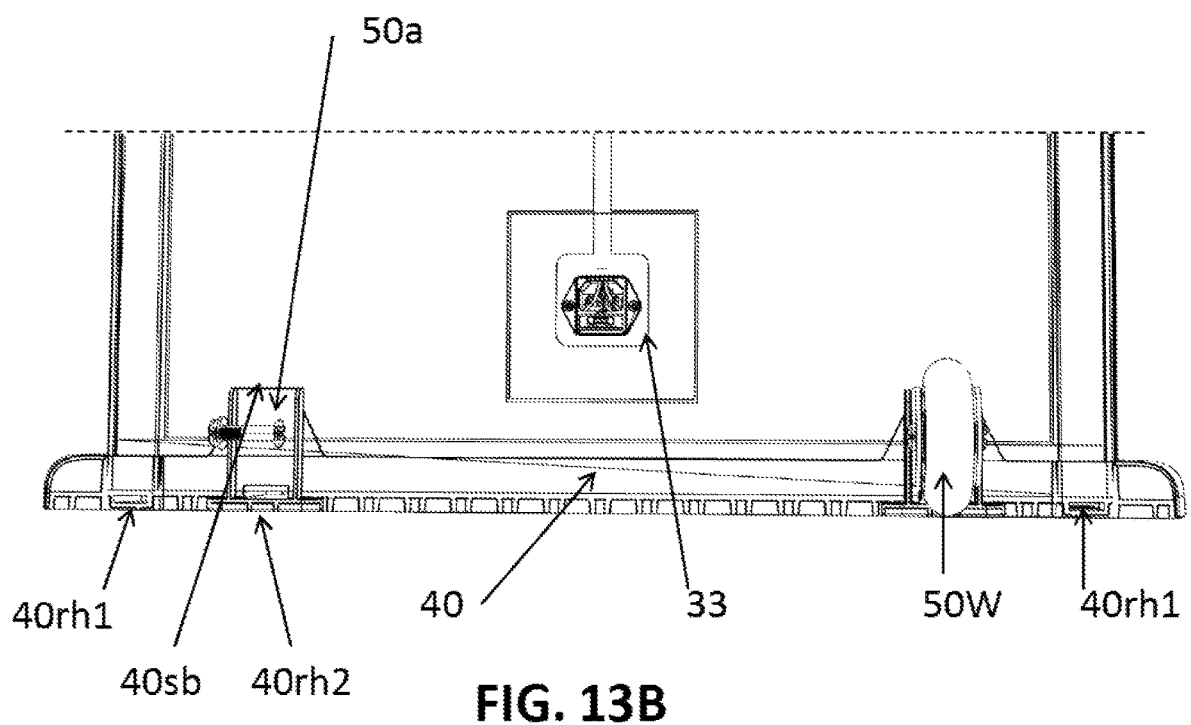
FIG. 13B is an outside perspective side view the outside of the footer shown in FIG. 13A, showing an outside view of the footer external to the walk-through passage of the walk-through detector.

Referring again to FIGS. 10-12, in some preferred embodiments, the replaceable wheel structure 50 includes a wheel 50W, a mounting bracket member 50B and a fixing mechanism 50a for fixing the wheel 50W to the bracket 50B. In some illustrative embodiments, the fixing mechanism can include, e.g., an axel bolt and nut that extends through opposing support arms of the bracket 50B and through a center of the wheel 50W and rotatably supports the wheel 50W. For illustrative purposes, the left side of FIG. 13A and FIG. 14A both show such an axe bolt and nut in some embodiments without corresponding wheel 50W and bracket 50B structure. In FIG. 10, separated components of an illustrative wheel structure are shown at a left side of the figure, and a second wheel structure is shown mounted to a footer 40 of the right side panel 30. As shown in, e.g., FIGS. 11 and 12 the bracket member 50B includes two opposing support arms that include two parallel plates a rounded end having a diameter smaller than that of the wheel so as not to interfere with portability and use, while having a planar shape for stability purposes. In addition, the bracket member 50B also preferably includes an L-shaped portion including a substantially vertically-mounted leg front which the two support arms extend and a substantially horizontally-mounted leg that is configure to be received within corresponding rectangular receiving holes 40rh2 (see, e.g., receiving holes 40rh2 shown in FIGS. 13A and 13B). As best seen in FIG. 12, the substantially horizontally-mounted leg portion of the bracket 50B also preferably includes a through-hole that is adapted to receive a vertically movable locking pin to latch the wheel structure 50 to the footer 40. In the preferred embodiments, as shown in FIG. 13A, a spring latch 40sL member can be manually raised and/or lowered to lock and/or disengage the bracket 50B to the footer. Towards that end, by vertically raising the visible portion of the latch 40sL to the position shown in FIG. 13A, the pin would disengage with the bracket member 50B. In preferred embodiments, upon releasing of the visible portion of the latch 40sL, an internal spring is arranged to spring-bias a locking pin into the hole of the substantially horizontally-mounted leg.

Figure 14A:
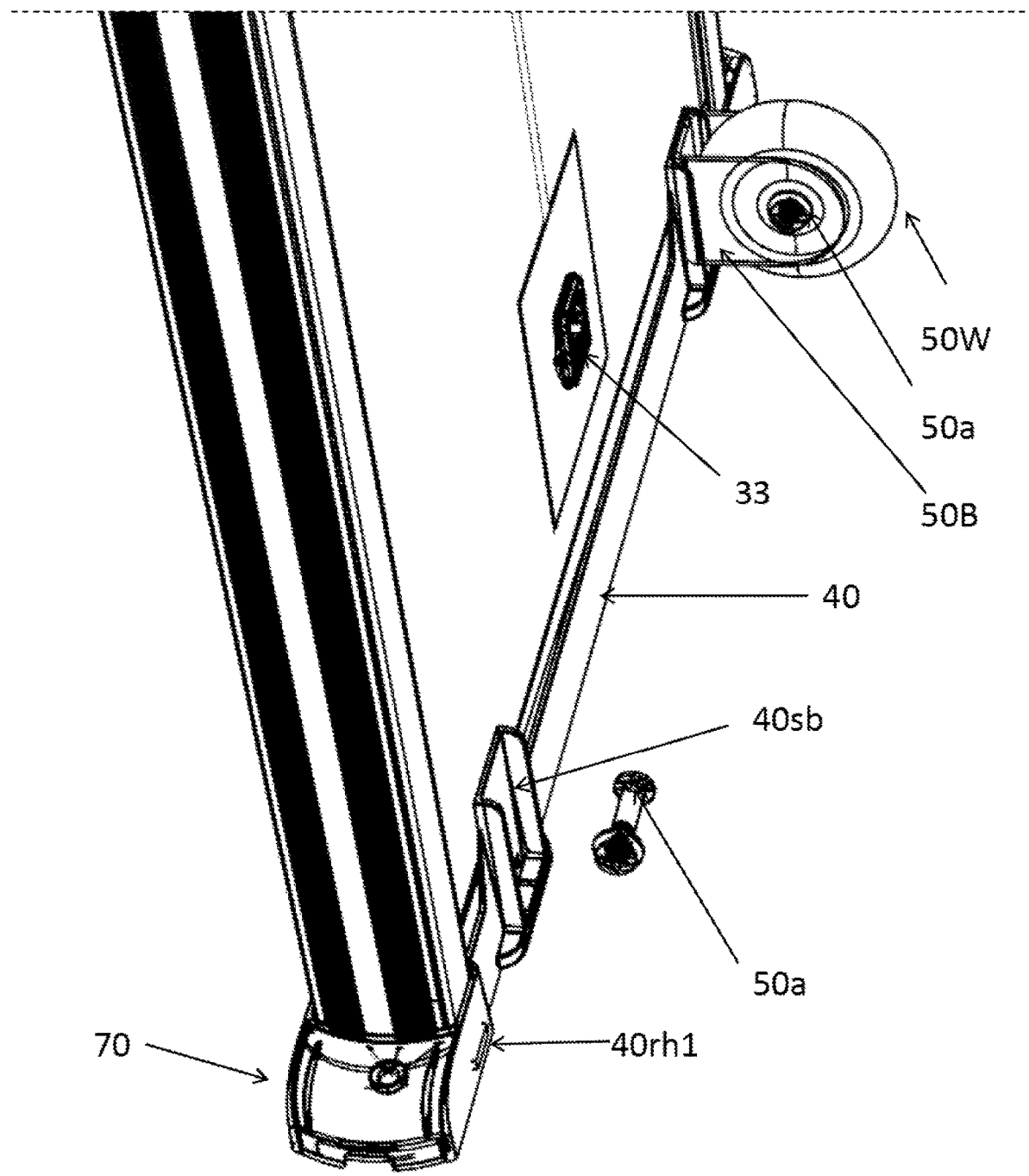
FIG. 14A is an outside perspective view of a bottom end of a side panel shown in FIG. 1 with a footer connected thereto depicting attachment of wheel structure according to preferred embodiments.
Figure 14B:
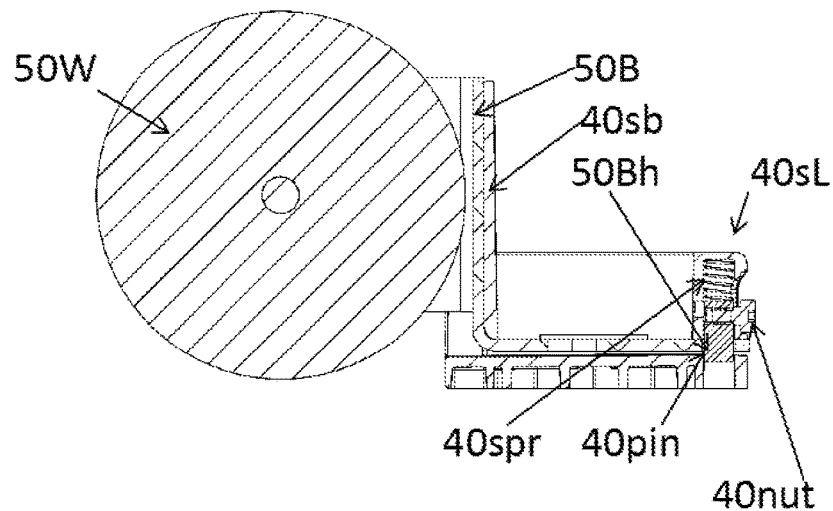
Figure 14C:
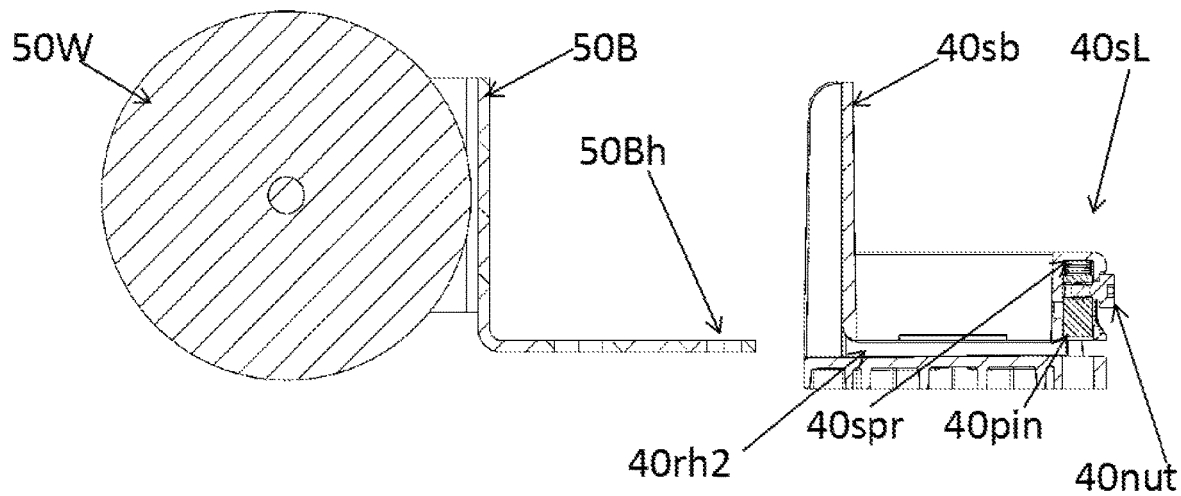
Figure 15:
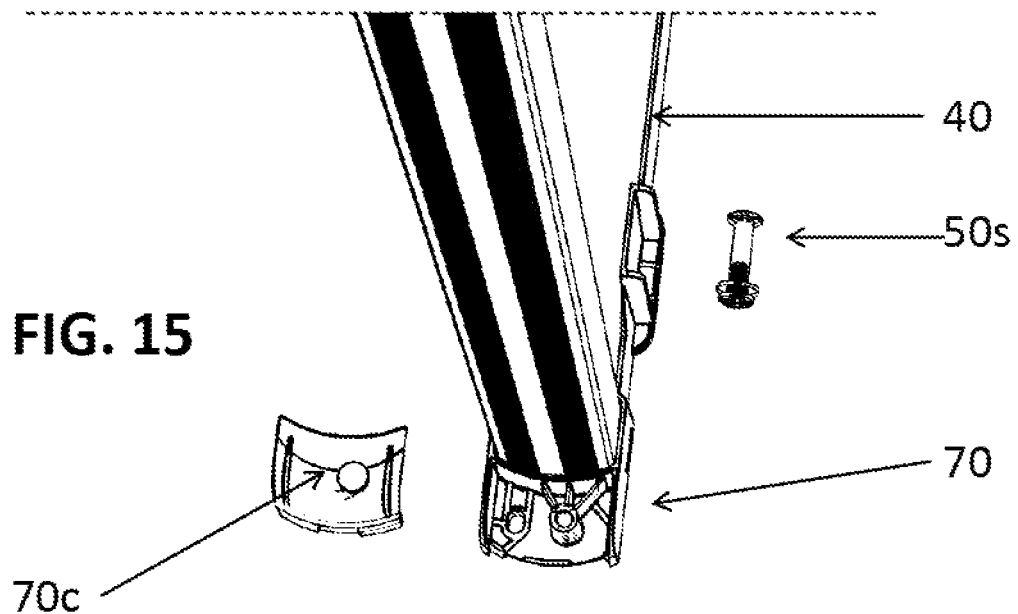
FIGS. 15 and 16 are perspective views of a footer portion connected to a side panel shown in FIG. 1 depicting components of a retaining bolt and leveling screw compartment according to some embodiments.

For further reference. FIGS. 14B and 14C are schematic diagrams illustrating how the wheel structure can be connected to and/or removed from the footer according to some illustrative embodiments, wherein FIG. 14B shows the wheel structure connected to the footer and FIG. 14C shows the wheel structure removed from the footer. As shown in FIG. 14C, a spring latch 40sL member can be manually raised to the position depicted to raise the pin 40pin to upward to allow the substantially horizontal leg portion of the bracket 50B to insert fully into the receiving hole 40rh2. Then, upon fully inserting the bracket 50B to a position shown in FIG. 14B, the spring latch 40sL can be manually released such that the spring 40spr pushes the top of the pin 40pin so that the pin 40pin engages with the through-hole 50Bh in the bracket 50B, whereby releasably retaining the wheel structure to the footer. In this illustrative embodiment, in order to manually raise the pin 40pin, a nut 40nut is fixedly attached to (e.g., screwed into) a side of the pin such as to extend to an external position (as also seen in FIG. 13A) whereby a user can readily manually raise the nut 40nut against the downward force applied by the coiled spring 40spr. Among other things, this illustrative embodiment enables the wheel structure to be readily engaged and/or disengaged without requiring external tools and/or additional parts.

In some preferred embodiments, the wheel structure 50 is configured such that the wheel 50W is fixedly attached to the bracket 50B (e.g., via an axel bolt and nut) and the combined structure is inserted within a correspondingly-shaped rectangular supporting bracket 40sb of the footer, with the substantial horizontal leg portion received inside the rectangular receiving hole 40rh2 such until the locking pin latches the wheel structure 50 in place. In some preferred embodiments, the lower end of the locking pin (not shown) is tapered such that upon insertion of the substantially horizontal leg portion into the receiving hole 40rh2, the locking pin will automatically be raised, until once the wheel structure is fully inserted into the rectangular supporting bracket with the substantially vertical leg portion contacting a surface of the supporting bracket 40sb, the locking pin will be aligned with and, hence, automatically spring biased so as to latch with the hole in the substantially horizontally-mounted leg portion.

Referring now to, e.g., FIGS. 6, 10, 18 and 19, in the preferred embodiments, the detector 1 is configured to store components of the attachable and removable support structure 60 and wheel structure 50 when the detector 1 is not being located, positioned and/or otherwise manipulated or moved for repositioning or placement. In some preferred embodiments, the control housing 10 includes a bottom panel 10bp that is pivotally mounted via a hinge 10h, such as to be configured to pivot downward to an open position beneath the control housing 10. In the preferred embodiments, the bottom panel 10bp is retained in a closed position via a latch or lock 10L which is in the illustrated embodiment operable by insertion of a key into the illustrated key hole to release the bottom panel 10bp to enable it to pivot downwardly to an open position.

Figure 19:
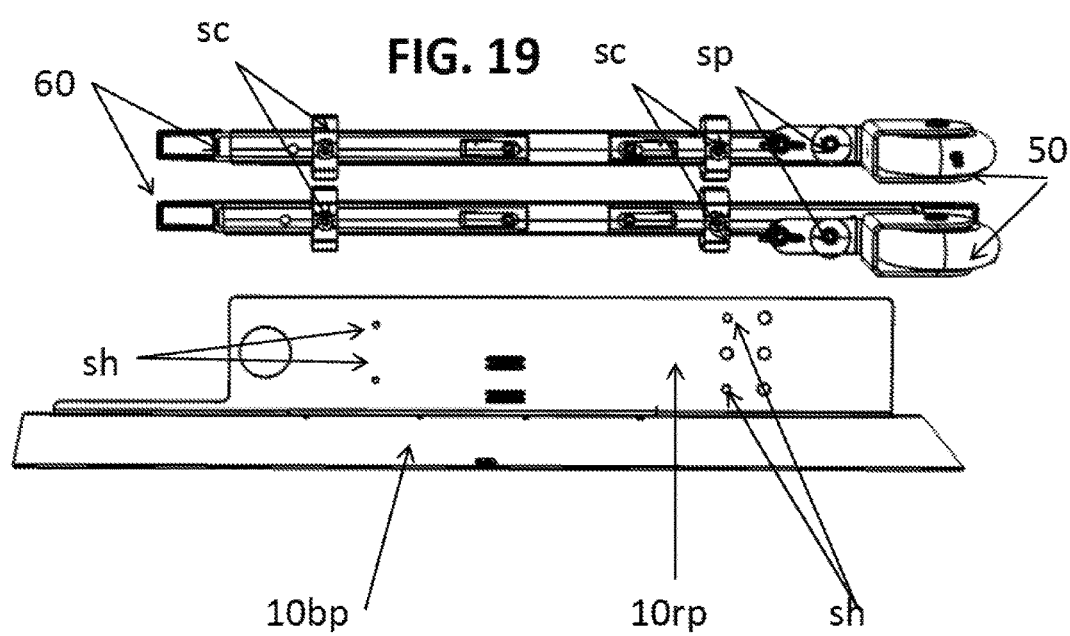
FIG. 19 is an explanatory figure showing a bottom panel and attached side panel of the control box shown in FIG. 18 along with brace structure and wheel structure that is supported on the attached side panel according to some illustrative embodiments.

In some preferred embodiments, as shown in FIG. 19, the bottom panel 10*bp* includes an upwardly extending rear support panel 10*rp* that is fixedly attached to the bottom panel 10*bp*. In the preferred embodiments, the rear panel 10*rp* includes a releasable attachment mechanism for releasably supporting components of the support structure 60 and the wheel structure 50 within an interior compartment of the control housing 10 for storage. In some embodiments, support clips (having pairs of flexible support arms) are mounted to the rear panel 10*rp* via support holes sh (e.g., using screws or the like), and the support clips resiliently expand to receive the support structure 60 in a fully contracted state (i.e., shortened state) for storage. In some embodiments, the wheel structure 50 is also releasably connected to the rear panel 10*rp* via releasable support pins sp that are releasably connected to corresponding ones of the support holes sh.

In some embodiments, the bottom panel 10*bp* and the rear support panel are integral connected at approximately a right angle such that when the bottom panel 10*bp* is pivoted downwardly, the rear panel 10*rp* is pivoted to a position to a substantially horizontal position in which the rear panel 10*rp* is presented to the opening created by pivoting of the bottom panel 10*bp*. In this manner, upon opening of the bottom panel, the support structure and the wheel structure 50 are presented to a user for easy access (e.g., for retrieval and/or replacement of components within the compartment in the control housing 10). In some embodiments, the rear panel 10*rp* is mounted to the bottom panel at a position displaced forward from a rear edge adjacent the hinge 10*h*, such that upon opening of the bottom panel 10*bp*, the rear panel 10*rp* is lowered to a position below the height of the bottom panel 10*bp* in a closed state. In this manner, upon opening of the bottom panel 10*bp*, when the bottom panel pivots to a fully downward position (e.g., hanging substantially vertically downwardly), the rear panel 10*rp* will extend substantially horizontally at a level below the bottom of the control housing 10 in a normal closed state whereby enabling easy access to the interior of the control panel by a user without requiring a stepping stool or the like despite the overhead location of the compartment within the control housing 10.

Figure 6:
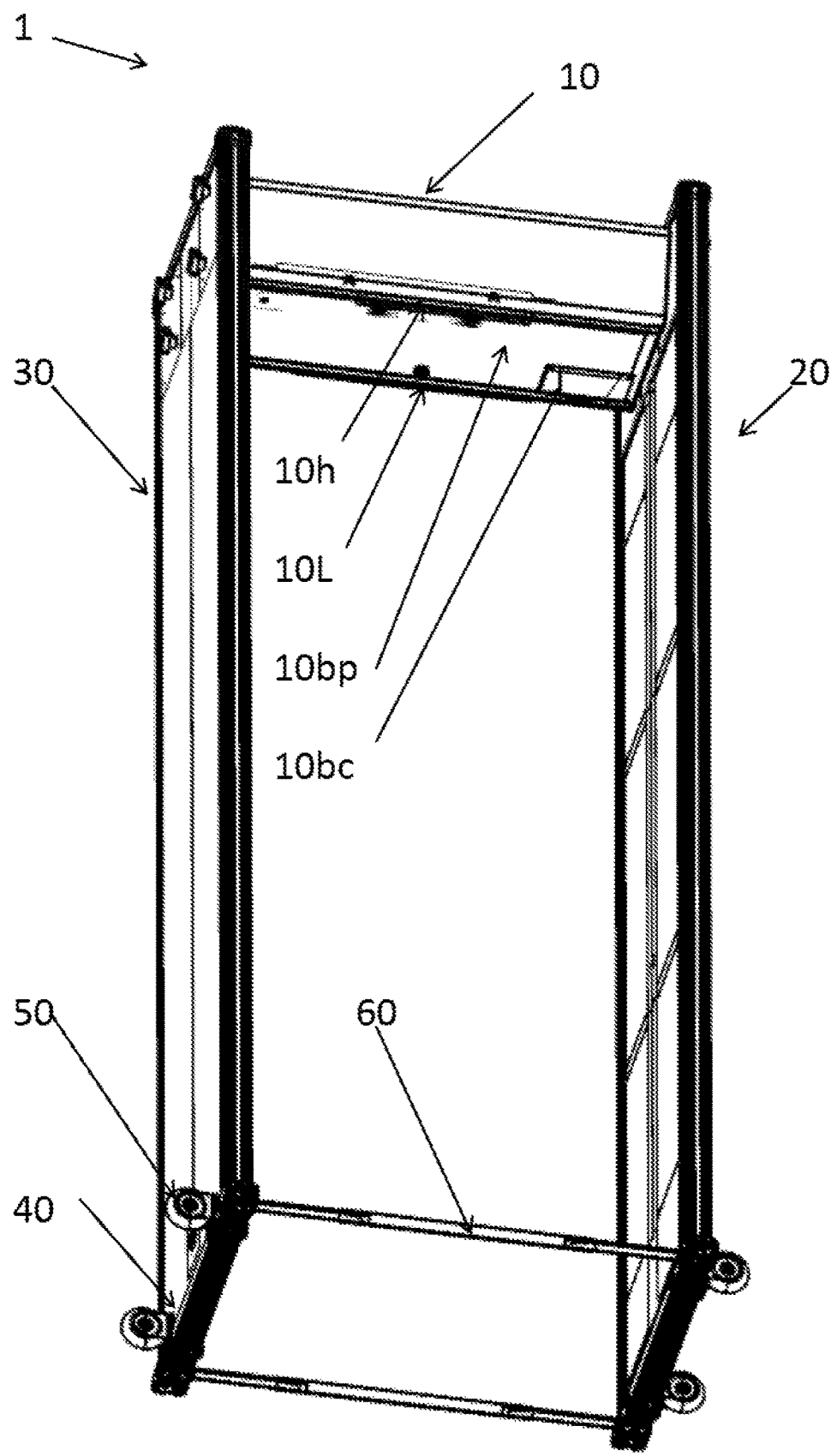
FIG. 6 is a bottom rear perspective view of the walk-through detector show in FIG. 1.
Figure 7:
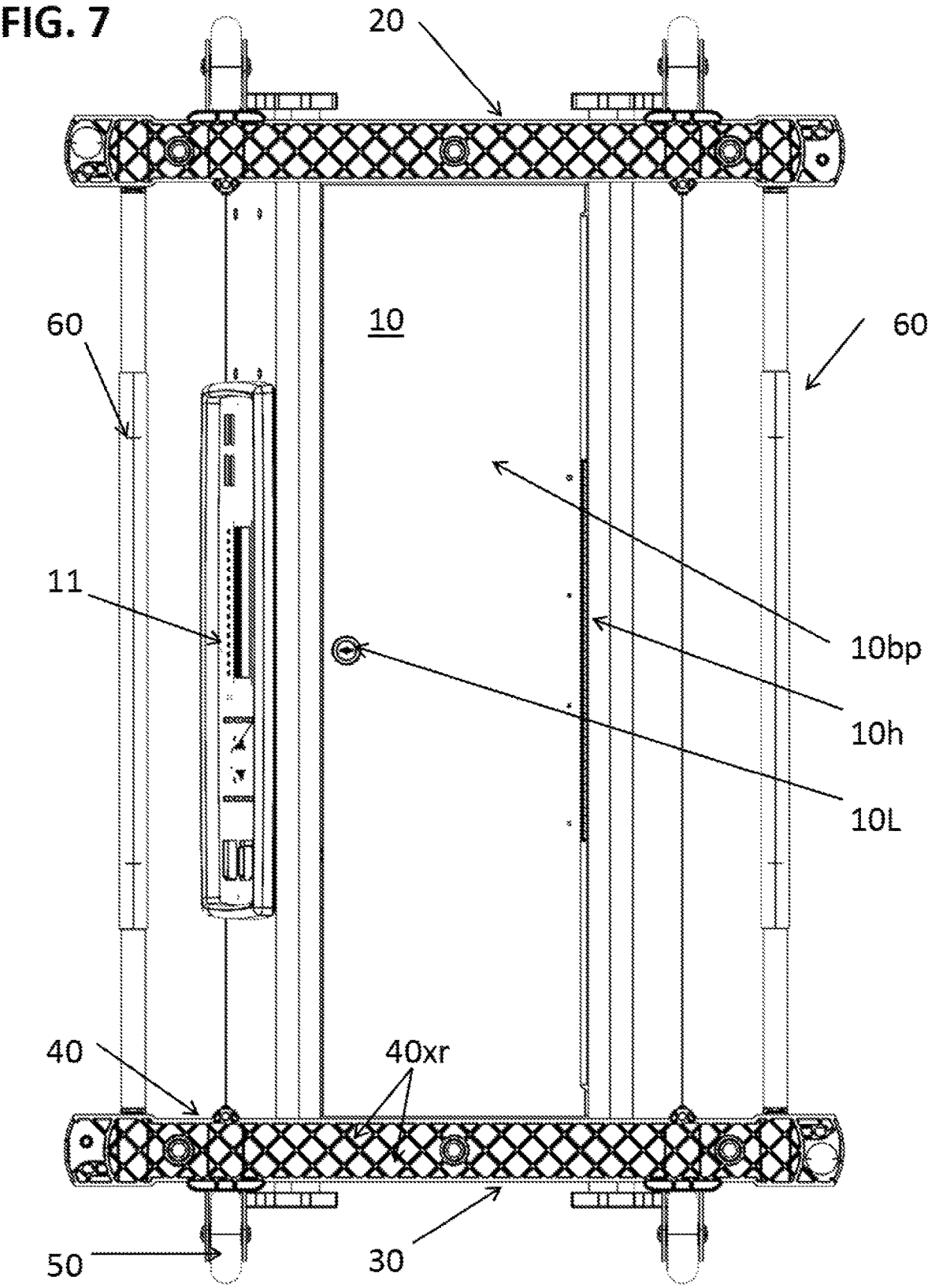
FIG. 7 is a bottom view of the walk-through detector shown in FIG. 1.
Figure 8:
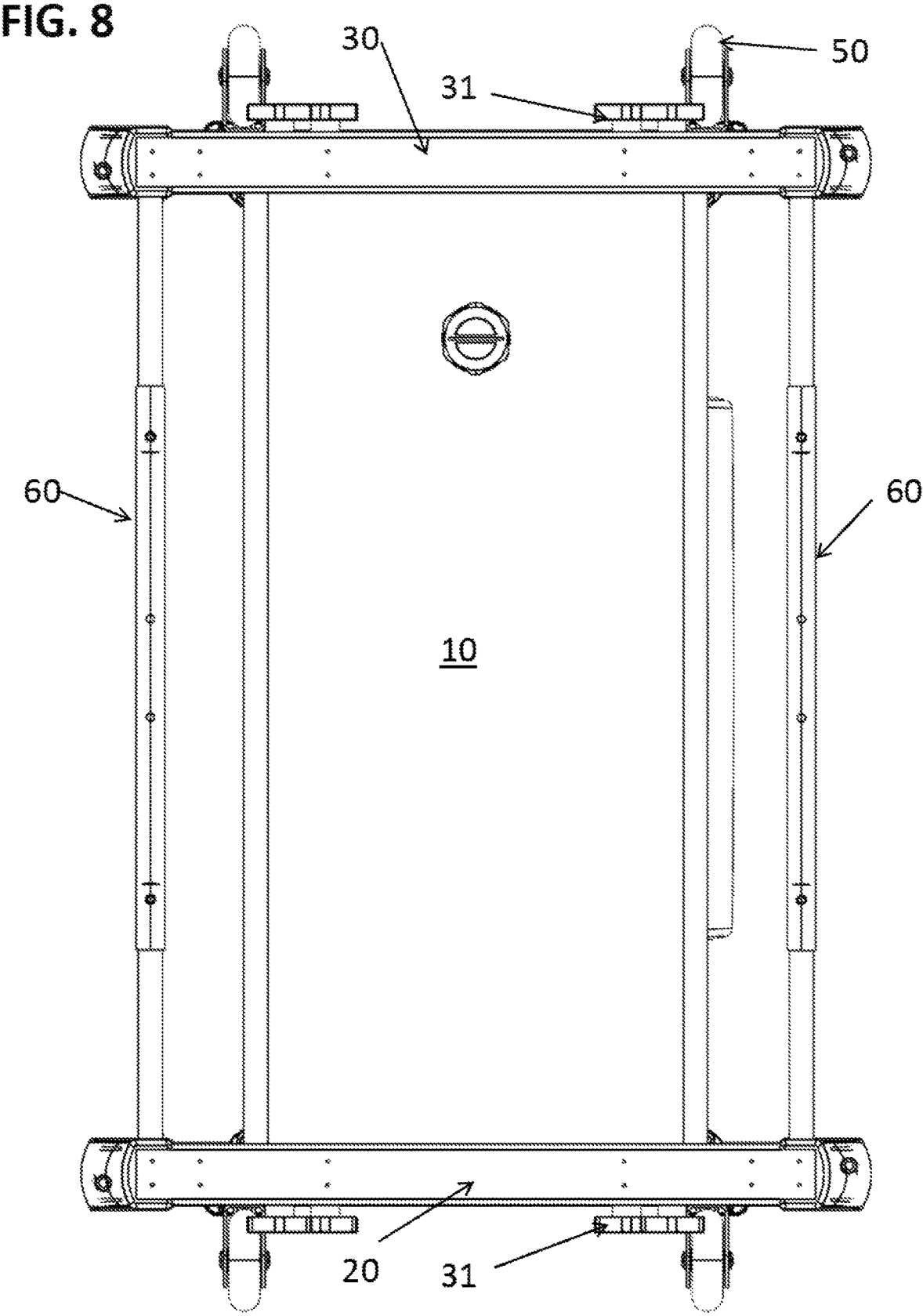
FIG. 8 is a top view of the walk-through detector shown in FIG. 1.
Figure 9:
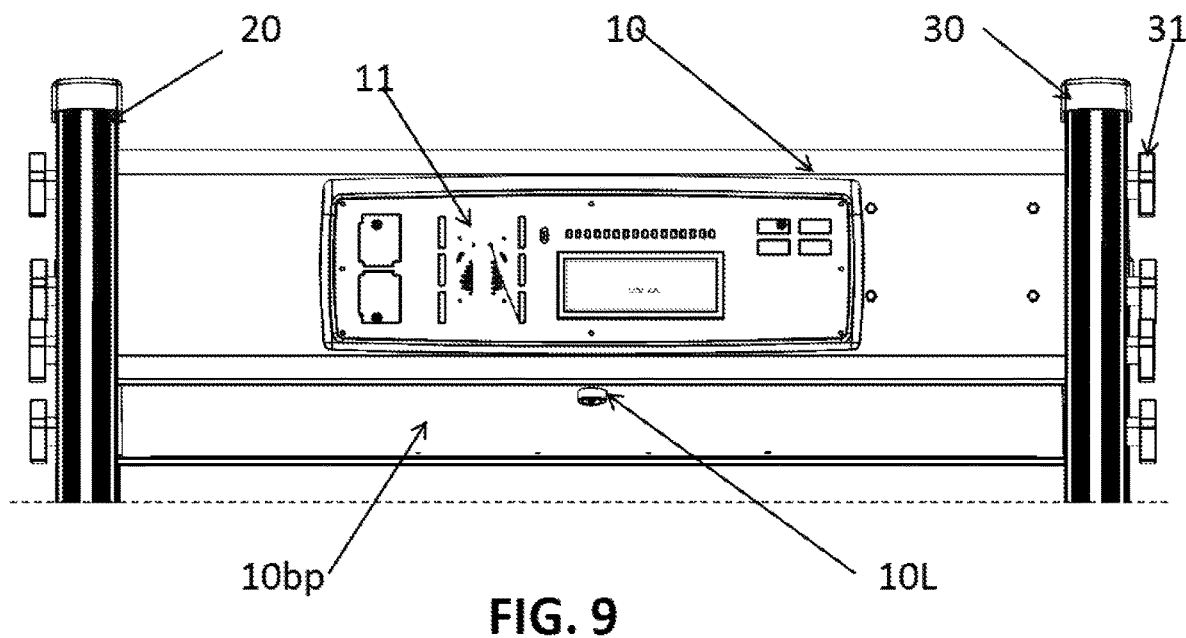
FIG. 9 is a front view of a top portion of the walk-through detector shown in FIG. 1 including a top support control box section of the walk-through detector.
Figure 18:
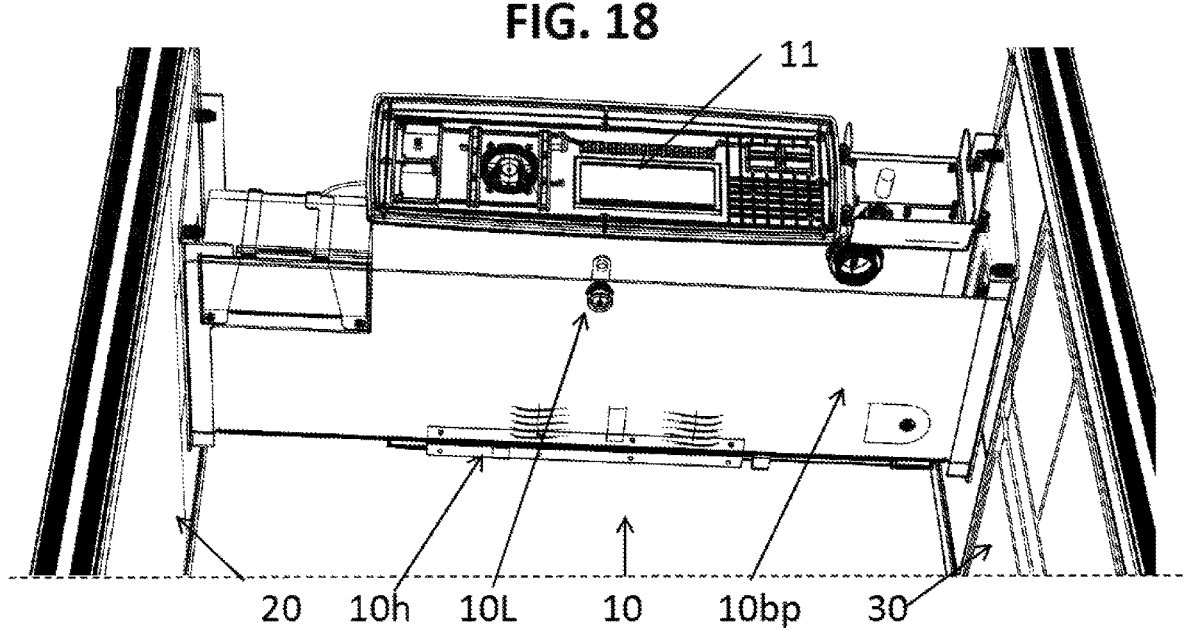
FIG. 18 is a front bottom perspective view of the top portion of the walk-through detector shown in FIG. 1 (with a top cover removed as shown in FIG. 10) depicting an openable bottom panel according to some embodiments.

To facilitate reference, FIGS. 10 and 18 show the interior 10*i* of the compartment within control housing 10 with a cover portion 10C removed for explanatory purposes. It should be appreciated that during use, the cover portion 10C would be in an attached state similar to that shown in, e.g., FIG. 1. As also shown in FIG. 10, in some embodiments, a power chord pc can also be stored within the control housing 10, which power chord can be connected via a desired plug interface 33 as discussed above. In some embodiments, an independently opened/separate battery compartment cover 10*bc* can be provided as shown in FIG. 6, which can be removed for replacement of batteries (e.g., which can supply power to the display and/or other components in some embodiments) without requiring unlocking and/or pivoting of the bottom panel 10*bp*, such that a daily operator of the detector 1 can replace batteries as needed without having to access interior components of the control housing 10.

Figure 16:
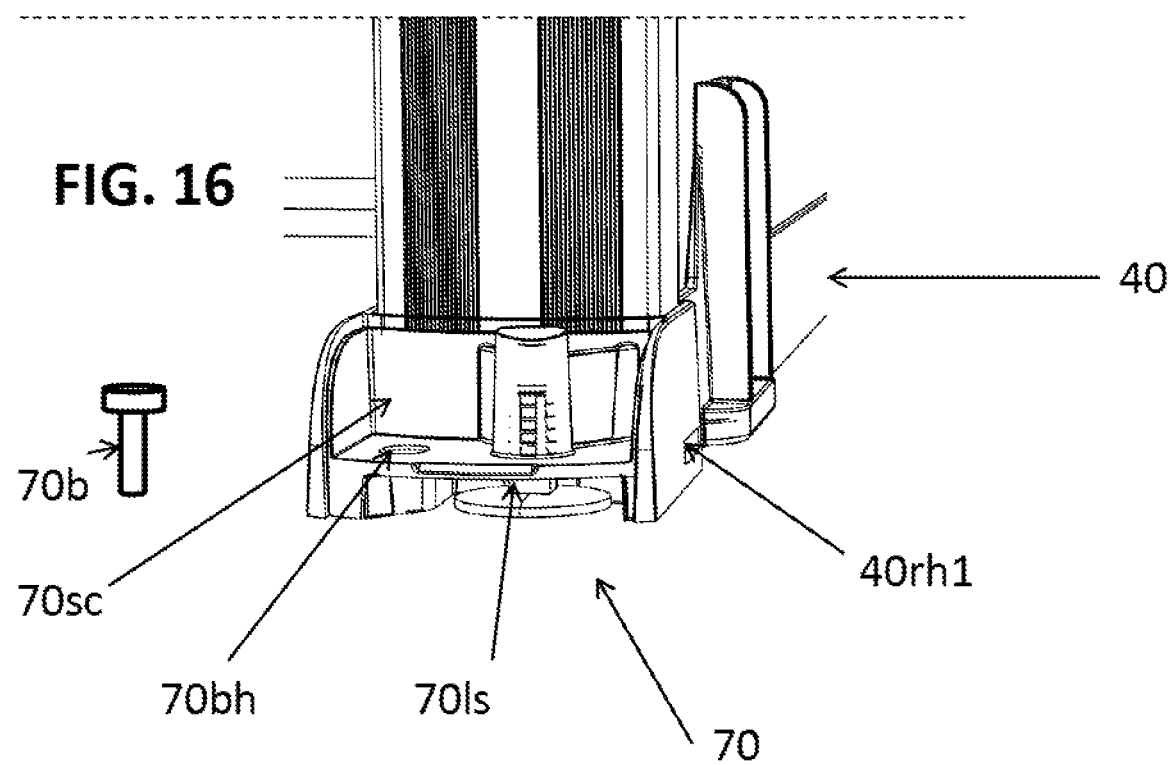

In some preferred embodiments, as illustrated in. FIG. 16, the device includes at least one storage compartment 70*sc* located within footers 40 of the side panels 20, 30 for employing removable lock-down bolts 70*b* that can be inserted within bolt holes 70*bh* and screwed or bolted to a ground or floor surface beneath the detector 1 to facilitate fixing of the detector 1 at an installation position or location, whether temporarily or permanently. In preferred embodiments, the lock-down bolts 70*b* are located within a covered compartment during use (i.e., obscured by the caps 70*c* shown in FIG. 15), whereby lock-down bolts can be covered by caps to hide the attachment to the flooring for aesthetics and concealment. Removal of these caps 70*c*, enables simple removal and/or installation of bolts 70*b* for ease of installation and removal.

Moreover, as also illustrated in FIG. 16, in some preferred embodiments, a leveling structure 70*ls* is also located within this same covered compartment 70*sc* that is covered during use. In this manner, the detector 1 can be stably and securely mounted upon a ground or floor surface at a desired location with necessary stability and securement features being readily on hand and hidden from view during normal use of the device. As shown in, e.g., FIG. 17, in some preferred embodiments, the leveling structure includes a threaded bolt member 70*lsb* that has a widened head portion that serves as an adjustably positionable floor support surface, wherein the bolt member 70*lsb* is threadedly engaged inside an internally-threaded cap portion 70*tc* that is fixed within a cylindrical tube or receptacle 70*ct* in such a manner that the internally-threaded cap portion 70*tc* does not rotate relative to the cylindrical tube 70*ct* (such as, e.g., employing interlocking spline portions or the like). In this manner, upon insertion of the bolt member 70*lsb* and the cap portion 70*tc* within the cylindrical tube 70*ct* (such as, e.g., so as to be in a state similar to that shown in FIG. 16), the head portion of the bolt member 70*lsb* can be manually rotated by a user to adjust the position of the head of the bolt with respect to the footer 40 so as to provide a leveling functionality. Although in some preferred embodiments the leveling structure 70*ls* includes a threaded bolt member that is inserted within an internally-threaded cap portion 70*tc* that is further inserted within the cylindrical tube 70*ct*, other embodiments could, e.g., omit the intermediary cap portion 70*tc* (such as, e.g., by providing internal threads directly within the cylindrical tube 700. However, to facilitate formation of the footer 40 by, e.g., molding or the like, in some preferred embodiments, a separate member (e.g., the cap portion 70*tc*) is provided to provide the corresponding threads that cooperate with threads on the bolt member 70*lsb*.

As discussed above, in some preferred embodiments, the device includes novel support footers (support feet) 40 that are mounted to lower ends of the side panels of the device. In the preferred embodiments, these novel support footers 40 include novel features enabling implementation of one or more, preferably all, of the above-described novel a) removable lock-down bolts and/or leveling structure, b) removable wheels, and/or c) removable support brackets. Towards that end, the support footer preferably includes novel attachment structure for removable and replaceable attachment of one or more, preferably all, of the above-described novel a) removable lock-down bolts and/or leveling structure, b) removable wheels, and/or c) removable support brackets. Notably, the novel support footers 40 are preferably configured to enable a single user to readily remove and/or attach such components without lifting or otherwise moving or manipulating the detector device to facilitate manipulation, portability, transport and management of the detector device.

Figure 17:
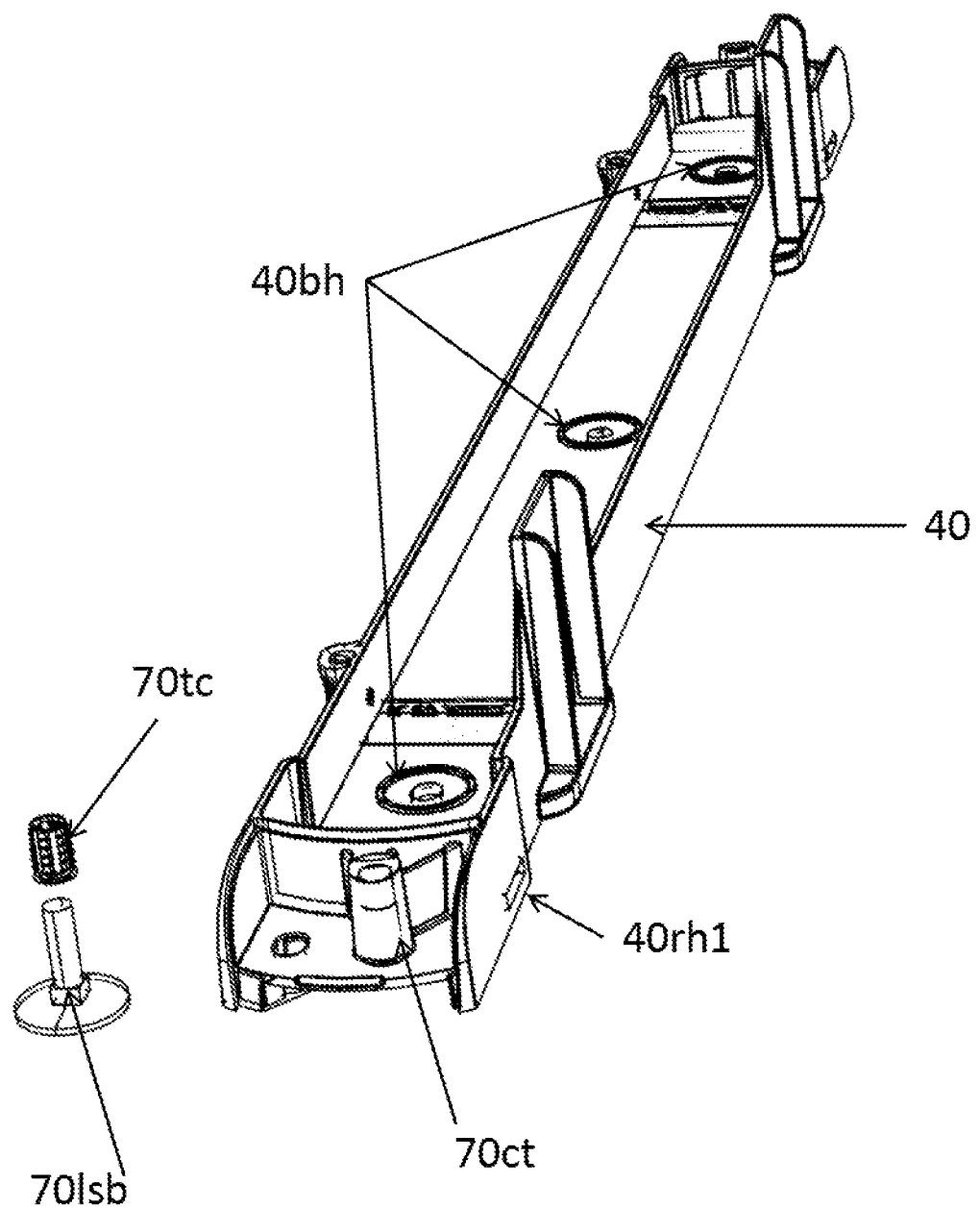
FIG. 17 is a top perspective view of a footer portion of the detector shown in FIG. 1 according to some embodiments.

With reference to, e.g., FIG. 17, in some embodiments, support footers 40 can be formed as rigid plastic member that is injection molded to otherwise molded such as to be configured as shown in FIG. 17. In some illustrative embodiments, the footers 40 can be mounted to the bottoms of the side panels 20, 30 by inserting bolts (not shown) through the bolt holes 40*bh* and engaging the bolts within corresponding nuts fixedly mounted on a lower end of the side panels 20, 30. Among other things, this novel footer 40 structure enables quick and easy adaptation of an inverted U-shaped detector to incorporate functionality of the present invention by simply attaching of such a novel footer 40 structure to the lower ends of the side panels 20, 30, whereby with the addition of the removable and replaceable wheel structure 50, support structure 60, fixing bolt structure 70*b* and/or leveling structure 70*ls*, a detector 1 can be providing having notable advantages and improvements noted herein-above, such as, e.g., in relation to portability, transport, management and positional locating of such a detector, with much greater ease, convenience, etc.

Although the footers 40 are preferably formed of a hard plastic material, in some alternative embodiments, the footers 40 can be formed of metals or other suitable materials. As shown in, FIG. 17, in some preferred embodiments, the footers 40 can be formed with a lattice of cross-ribs 40*xr* that enhance structural rigidity of the footers 40. In the preferred embodiments, the cross-ribs and all of the structure of the footers 40 can be readily formed during injection molding thereof.

In the preferred embodiments, while the footers 40 are preferably formed of a hard plastic material, such as, e.g., by way of example, polyvinyl chloride, polyethylene, polypropylene, acrylic, polyamides, etc., the bracket members 50B are preferably made of a metal, such as, e.g., with steel, brass, aluminum, copper and/or other suitable metal materials or alloys. With the structure of the footers 40 and bracket members 50B, employing strong metal bracket members 50B along with plastic footer structure can provide sufficient strength and rigidity without otherwise increasing weight, costs or difficulty in manufacture of the detector 1.

Figure 20:
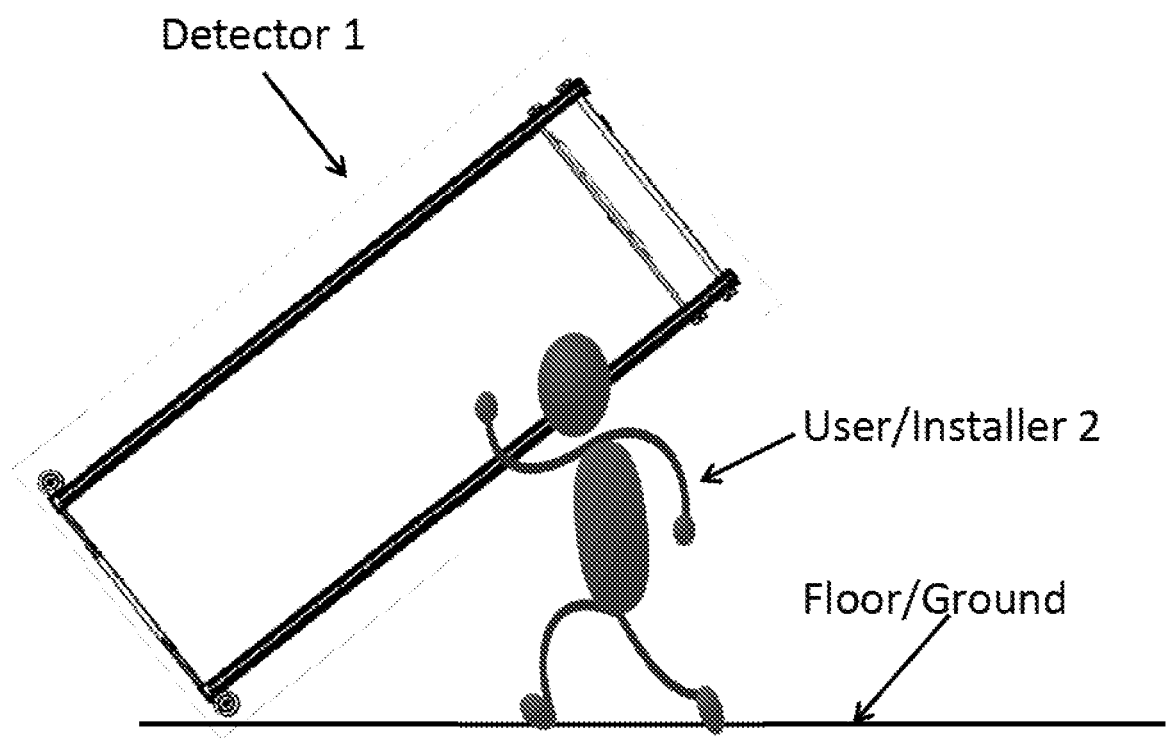
FIG. 20 is a schematic diagram depicting a user or installer transporting a walk-through detector according to some preferred embodiments of the invention in a tilted orientation such that the detector is supported upon wheel structure for transport along a floor or ground surface.

Referring now to FIG. 20, in some preferred embodiments, a detector 1 according to embodiments of the present invention can, thus, be readily moved and/or manipulated by one or more users or installers 2 employing the novel features of the present invention as set forth above. Towards that end, as shown in, FIGS. 1-6 and 13B, in the preferred embodiments, wheels 50W can be readily attached to the detector 1 by a user or installer in such a manner as to be aligned with or substantially aligned with the floor surface (see floor shown in FIG. 20). At the same time, the wheels 50W are securely mounted to the detector employing novel bracket 50B and footer 40 structure, allowing for the detector 1 to be manually tilted as shown in FIG. 20 by a user or installer 2 such that the detector is supported upon the wheels 50W for easy manipulation or transport. Moreover, the foregoing novel support structure 60 enables the detector to be supported in such an inclined state without damage to the detector and/or without other difficulties in the absence of such support structure 60.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A walk-through detector adapted 1 for handling by one or more user without external tools, comprising:
   an upwardly extending left side panel;
   an upwardly extending right side panel;
   a top member connecting between said left side panel and said right side panel proximate upper ends of said left side panel and said right side panel; and
   detector handling structure for handling of the walk-through detector by one or more user without external tools, including:
   a) at least one replaceable wheel structure configured to be removably attached to said left side panel and/or said right side panel proximate their lower ends without employing external tools while said left side panel and said right side panel are in a resting position on a ground or floor surface and without lifting said detector;
   b) at least one replaceable support member configured to be removably attached to said left and right side panels proximate their lower ends by manually elongating said at least one replaceable support member such that end projections of said at least one replaceable support member are received within receiving holes proximate the lower ends of said left and right side panels;
   c) at least one compartment within said top member storing at least one replaceable support member and/or at least one replaceable wheel member after installation of the walk-through detector; and/or
   d) at least one compartment within a footer member attached to a bottom end of said left or right side panel, said compartment having an operable cover and having a bottom hole in a floor of said compartment for extending a ground-attaching member to a ground or floor surface and said compartment having a leveling mechanism therein for leveling of said detector on the ground or floor surface;
   whereby said walk-through detector can be handled by one or more user without external tools to facilitate transport or locating of said detector by the one or more user.

2. The walk-through detector of claim 1, wherein said walk-through detector is a walk-through metal detector.

3. The walk-through detector of claim 1, wherein said walk-through detector is substantially an inverted U-shape, with the left side panel and the right side panel forming legs of the U-shape and the top member forming a base of the U-shape.

4. The walk-through detector of claim 1, wherein the top member of the walk-through detector is a control housing containing control structure of the walk-through detector.

5. The walk-through detector of claim 1, wherein said detector includes each of said a) at least one replaceable wheel structure, b) at least one replaceable support member, c) at least one compartment within said top member, and d) at least one compartment within a footer member.

6. The walk-through detector of claim 1, wherein said detector includes said at least one compartment within said top member.

7. The walk-through detector of claim 6, wherein said detector further includes said at least one replaceable wheel structure and said at least one replaceable support member, and wherein said at least one compartment within said top member includes a bottom panel that pivots downwardly to expose said at least one replaceable wheel structure and said at least one replaceable support member to a user.

8. The walk-through detector of claim 7, wherein said at least one replaceable support member and said at least one replaceable wheel member is mounted such as to move along with the bottom panel such as to be brought closer to the user upon downwardly pivoting the bottom panel.

9. The walk-through detector of claim 1, wherein said detector includes at least one of a) said at least one replaceable wheel structure and b) said at least one replaceable support member, and wherein said left and right side panels each include footer members having structure for replaceably attaching at least one of a) said at least one replaceable wheel structure and b) said at least one replaceable support member.

10. The walk-through detector of claim 9, wherein said footer members are made of a molded plastic.

11. The walk-through detector of claim 9, wherein said detector includes said at least one compartment within said top member.

12. The walk-through detector of claim 1, wherein said detector includes said at least one replaceable support member, and wherein each said at least one replaceable support member includes a telescoping brace member that is configured to be replaceably extended between said first and second side panels.

13. The walk-through detector of claim 1, wherein said detector includes said at least one replaceable wheel structure, and wherein each said at least one replaceable wheel structure includes a metal support bracket that rotatably supports a wheel, wherein the metal support bracket is removably connectable to at least one of said first or second side panels by laterally inserting a leg portion of the metal bracket within a supporting recess in said first or second side panels while said first and second side panels are in a resting position on a floor or ground surface without lifting of said first or second side panels.

14. The walk-through detector of claim 13, further including a spring-biased locking pin that retains said leg portion within said supporting recess upon insertion of said leg portion within said supporting recess.

15. The walk-through detector of claim 14, wherein spring biased locking pin is manually movable without external tools to release the wheel member.

16. The walk-through detector of claim 1, wherein said detector includes said at least one replaceable wheel structure.

17. The walk-though detector of claim 16, wherein said detector includes said at least one replaceable support member.

18. The walk-through detector of claim 17, wherein said detector includes said at least one compartment within said top member.

19. The walk-through detector of claim 16, wherein said detector includes said at least one compartent within said top member.

20. The walk-through detector of claim 1, wherein said detector includes said at least one compartment within the footer member.

21. The walk-through detector of claim 1, wherein said detector includes said at least one replaceable support member.

22. A method of handling a walk-through detector without external tools by one or more user, comprising:
a) providing a walk-through detector including:
an upwardly extending left side panel;
an upwardly extending right side panel;
a top member connecting between said left side panel and said right side panel proximate upper ends of said left side panel and said right side panel; and
detector handling structure for handling of the walk-through detector by one or more user without external tools, including:
i) at least one replaceable wheel structure configured to be removably attached to said left side panel and/or said right side panel proximate their lower ends without employing external tools while said left side panel and said right side panel are in a resting position on a ground or floor surface and without lifting said detector;
ii) at least one replaceable support member configured to be removably attached to said left and right side panels proximate their lower ends by manually elongating said at least one replaceable support member such that end projections of said at least one replaceable support member are received within receiving holes proximate the lower ends of said left and right side panels;
iii) at least one compartment within said top member storing at least one replaceable support member and/or at least one replaceable wheel member after installation of the walk-through detector; and/or
v) at least one compartment within a footer member attached to a bottom end of said left or right side panel, said compartment having an openable cover and having a bottom hole in a floor of said compartment for extending a ground-attaching member to a ground or floor surface and said compartment having a leveling mechanism therein for leveling of said detector on the ground or floor surface; and
b) manually transporting or locating the walk-through detector by one or more user without external tools to facilitate transport or locating of said detector by the one or more user.

23. The method of claim 22, further comprising:
having at least one user manually attach at least one replaceable wheel structure to said left side panel or said right side panel without employing external tools while said left side panel and said right side panel are in a resting position on the ground or floor surface and without lifting said detector; and having the at least one user manually incline the walk-through detector to a tilted orientation such that at least one replaceable wheel structure supports said detector upon the ground or floor surface and at least one replaceable support member supports weight of the left side panel or the right side panel furthest from the ground or floor surface when in the tilted orientation.

24. The method of claim 23, further including storing the at least one replaceable support member and the at least one replaceable wheel structure within a compartment within the detector after installation.

25. The method of claim 23, further including providing the at least one compartment in the top member, wherein the at least one compartment in the top member includes a bottom panel that pivots downwardly, and having the at least one user pivot the bottom panel such as to present at least one replaceable support member or at least one replaceable wheel structure contained within said at least one compartment.

26. The method of claim 23, further including providing the at least one compartment in the top member, wherein the at least one compartment in the top member includes a bottom panel that pivots downwardly, and having a single user pivot the bottom panel such as to present at least one replaceable support member or at least one replaceable wheel structure contained within said at least one compartment.

27. The method of claim 22, further comprising:
having a single user manually attach at least one replaceable wheel structure to said left side panel or said right side panel without employing external tools while said left side panel and said right side panel are in a resting position on the ground or floor surface and without lifting said detector; and
having the single user manually incline the walk-through detector to a tilted orientation such that at least one replaceable wheel structure supports said detector upon the ground or floor surface and at least one replaceable support member supports weight of the left side panel or the right side panel furthest from the ground or floor surface when in the tilted orientation.

* * * * *